United States Patent
Sawai

(10) Patent No.: US 8,824,401 B2
(45) Date of Patent: Sep. 2, 2014

(54) COMMUNICATION SYSTEM, METHOD, BASE STATION, AND COMMUNICATION DEVICE

(75) Inventor: Ryo Sawai, Tokyo (JP)

(73) Assignee: Sony Corporation, Tokyo (JP)

(*) Notice: Subject to any disclaimer, the term of this patent is extended or adjusted under 35 U.S.C. 154(b) by 222 days.

(21) Appl. No.: 13/394,568

(22) PCT Filed: Jun. 18, 2010

(86) PCT No.: PCT/JP2010/004087
§ 371 (c)(1),
(2), (4) Date: Mar. 7, 2012

(87) PCT Pub. No.: WO2011/036831
PCT Pub. Date: Mar. 31, 2011

(65) Prior Publication Data
US 2012/0170507 A1    Jul. 5, 2012

(30) Foreign Application Priority Data

Sep. 25, 2009  (JP) ................ 2009-220484

(51) Int. Cl.
*H04W 4/00* (2009.01)
*H04B 7/04* (2006.01)
*H04W 72/04* (2009.01)
*H04B 7/06* (2006.01)
*H04L 5/00* (2006.01)
*H04W 88/06* (2009.01)
*H04B 7/155* (2006.01)
*H04W 72/08* (2009.01)
*H04W 84/04* (2009.01)

(52) U.S. Cl.
CPC ........ *H04W 72/0406* (2013.01); *H04W 72/085* (2013.01); *H04B 7/0413* (2013.01); *H04W 84/047* (2013.01); *H04B 7/0689* (2013.01); *H04L 5/001* (2013.01); *H04L 5/0035* (2013.01); *H04W 88/06* (2013.01); *H04B 7/15557* (2013.01)
USPC ............................. 370/329; 370/465; 455/436

(58) Field of Classification Search
USPC ......... 370/315, 328–329, 331–334, 341, 348, 370/437, 443–444, 465, 468; 455/436, 455/450–451, 452.1–452.2, 454, 464
See application file for complete search history.

(56) References Cited

U.S. PATENT DOCUMENTS 8,254,368 B2 * 8/2012 Huber et al. ................. 370/350
2010/0091675 A1   4/2010 Sawai (Continued)

FOREIGN PATENT DOCUMENTS

JP   2003-92782 A    3/2003
JP   2006-148388      6/2006

(Continued)

OTHER PUBLICATIONS

"Impacts, Impact on implementation and complexity", Release 8, 3GPP TR 25.825 V1.0.0, May 2008, pp. 50-51.

(Continued)

*Primary Examiner* — Kevin Mew
(74) *Attorney, Agent, or Firm* — Oblon, Spivak, McClelland, Maier & Neustadt, L.L.P.

(57) ABSTRACT

A wireless communication system, using wireless base stations, and other devices, such as a relay node, interoperate with using spectrum aggregation and MIMO. Traffic usage is detected and based on channel utilization relative to capacity, spectrum aggregation is chosen over MIMO under certain conditions. On the other hand, under higher channel utilization system components switch to MIMO modes of operation to reduce demand on channel use, while providing good throughput for communications stations.

19 Claims, 19 Drawing Sheets

(56) References Cited

U.S. PATENT DOCUMENTS

| | | | |
|---|---|---|---|
| 2011/0228666 A1* | 9/2011 | Barbieri et al. | 370/216 |
| 2011/0310837 A1* | 12/2011 | Classon et al. | 370/329 |
| 2012/0033643 A1* | 2/2012 | Noh et al. | 370/335 |
| 2012/0106495 A1* | 5/2012 | Yang et al. | 370/329 |
| 2012/0163309 A1* | 6/2012 | Ma et al. | 370/329 |
| 2013/0003552 A1* | 1/2013 | Lott et al. | 370/235 |
| 2013/0077554 A1* | 3/2013 | Gauvreau et al. | 370/312 |

FOREIGN PATENT DOCUMENTS

| | | |
|---|---|---|
| JP | 2008-219625 | 9/2008 |
| JP | 2009-171504 | 7/2009 |
| JP | 2010-74760 | 4/2010 |
| JP | 2010-232847 | 10/2010 |
| WO | WO 03/015444 A1 | 2/2003 |

OTHER PUBLICATIONS

Japanese Office Action issued Dec. 24, 2013 in Patent Application No. 2009-220484.

Samsung, "Carrier Aggregation in LTE-A DL", 3GPP TSG-RAN WG1 Meeting # 54, R1-082888, Aug. 18-22, 2008, 13 pages.

Office Action issued Oct. 8, 2013 in Japanese Patent Application No. 2009-220484.

Combined Chinese Office Action and Search Report issued Mar. 5, 2014, in Chinese Patent Application No. 201080041234.0 with English translation.

Cao Gen, et al., "The multi-Carrier Aggregation Technology in LTE-Advanced System", Modern Science & Technology of Telecommunications, Feb. 28, 2009, pp. 4-8 with English translation of Relevant Parts.

\* cited by examiner

FIG. 3
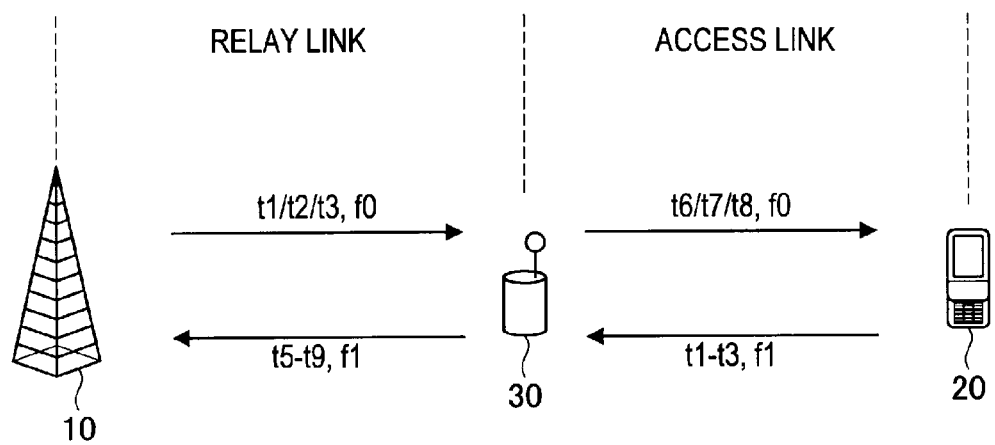
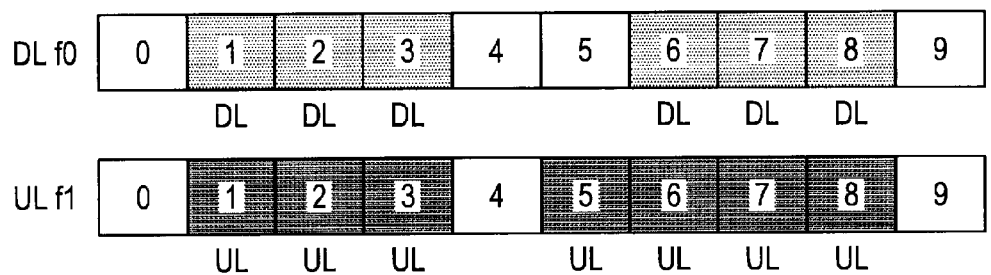

COMMUNICATION SYSTEM, METHOD, BASE STATION, AND COMMUNICATION DEVICE

TECHNICAL FIELD

The present invention relates to a communication system, a communication method, a base station, and a communication device.

BACKGROUND ART

A relay technique is standardized in IEEE (Institute of Electrical and Electronics Engineers) 802.16j. Further, in 3GPP (3rd Generation Partnership Project) LTE-A (Long Term Evolution-Advanced) also, a technique using a relay node (RN) is studied actively in order to improve the throughput of a user equipment (UE) located at the cell edge.

Further, in LTE, base stations are operated using a frequency band with a bandwidth of 1 MHz to 20 MHz with respect to a certain center frequency. It is thus not assumed that a communication device uses discrete channels. On the other hand, it is under consideration in LTE-A that the user equipment reserves a band of 20 MHz or more by spectrum aggregation that makes simultaneous use of discrete or sequential channels to achieve higher throughput.

CITATION LIST

Patent Literature

[PTL 1] Japanese Unexamined Patent Application Publication No. 2006-148388

Japanese Unexamined Patent Application Publication No. 2006-148388 (JP 2006-148388), attributable to the present inventor, and incorporated herein by reference in its entirety, discloses a radio communication device that includes a plurality of antennas, and uses some antennas for reception processing, for example, as a first reception/transmission process and uses other antennas for transmission processing, for example, as a second reception/transmission process.

SUMMARY OF INVENTION

Technical Problem

In order to handle the dispersive channels by one receiver "branch" (an antenna, an analog processing unit etc., and sometimes referred to as a receiver "channel"), a filter or FFT compatible with a high bandwidth is necessary. In view of this, it is possible to simplify the configuration of each branch by applying the radio communication device disclosed in the above-described JP 2006-148388 to spectrum aggregation and making different channels (communication channels) correspond to the respective branches (receiver branches).

However, as recognized by the present inventor, the use of spectrum aggregation causes an increase in the number of channels allocated for communication with one communication device, which puts a severe strain on resources compared to multiple-input, multiple output (MIMO) communication.

In light of the foregoing, it is desirable to provide a communication system, a base station and a communication device which are novel and improved, and which enable switching between spectrum aggregation mode and MIMO mode in accordance with observed traffic volume for a given channel capacity.

BRIEF DESCRIPTION OF DRAWINGS

FIG. 3 is an explanatory view showing an example of resource allocation in the case of using different frequencies in UL and DL.

DESCRIPTION OF EMBODIMENTS

Figure 1:
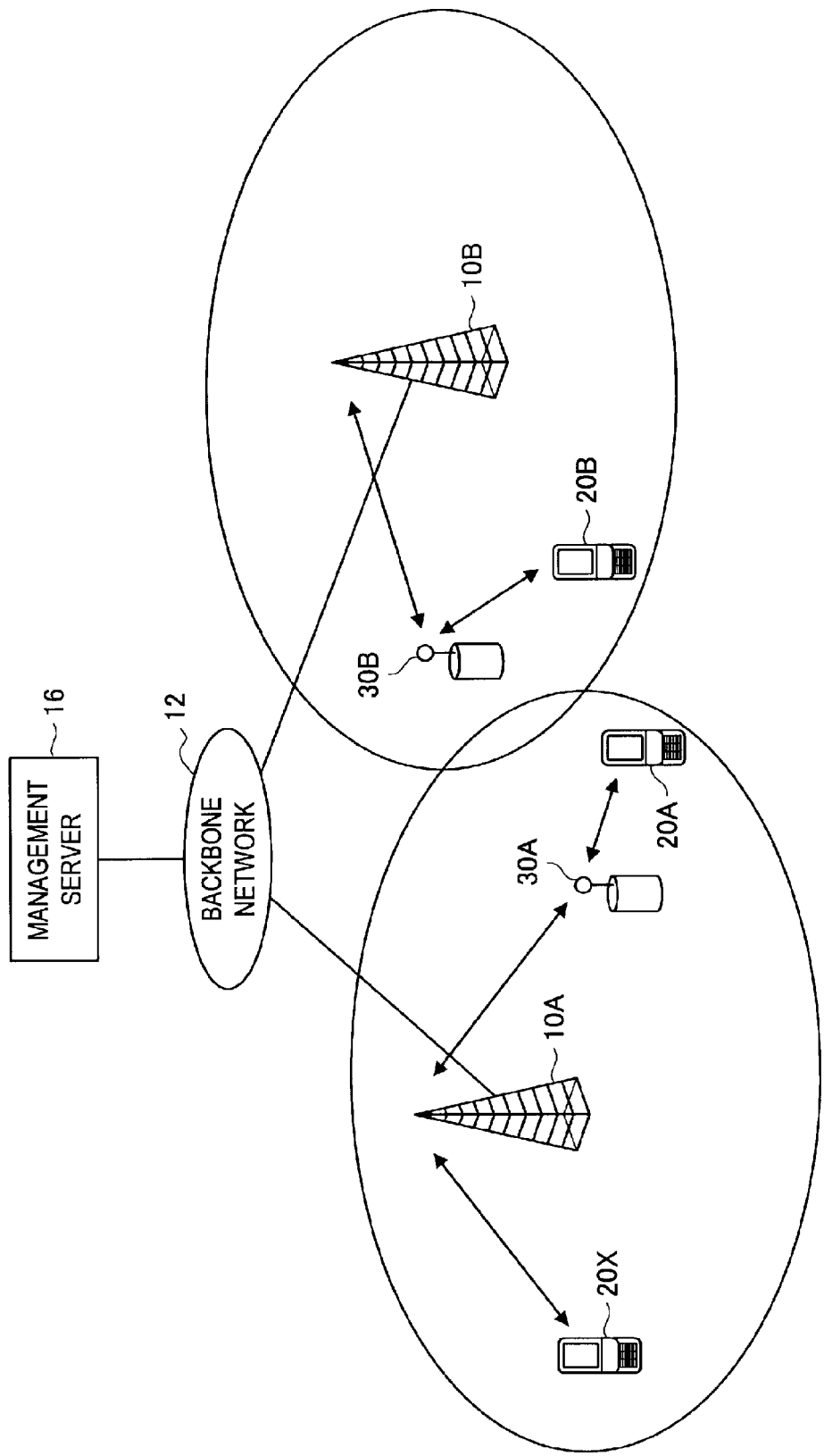
FIG. 1 is an explanatory view showing a configuration of a communication system according to an embodiment of the present invention.

Hereinafter, embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, each of a plurality of structural elements having substantially the same function is distinguished by affixing a different alphabetical letter to the same reference numeral in some cases. For example, a plurality of structural elements having substantially the same function are distinguished like user equipments 20A, 20B and 20C where necessary. However, when there is no particular need to distinguish between a plurality of structural elements having the same function, they are denoted by the same reference numeral. For example, when there is no particular need to distinguish between the user equipments 20A, 20B and 20C, they are referred to simply as the user equipment 20.

Embodiments of the present invention will be described hereinafter in the following order.

1. Basic Configuration of Communication System
(Example of Resource Allocation to Each Link)
(Example of Format of Radio Frame)
(Connection Processing Sequence)
(MBSFN)
(Example of Frequency Allocation to Each Cell)
2. Illustrative Configuration of Communication System
2-1. Switching Between Spectrum Aggregation Mode and MIMO Mode
2-2. Multi-Link Connection
2-3. Combination of Comp and Spectrum Aggregation
<1. Basic Configuration of Communication System>

A basic configuration of a communication system 1 according to an embodiment of the present invention is described hereinafter with reference to FIGS. 1 to 8. FIG. 1 is an explanatory view showing a configuration of the communication system 1 according to an embodiment of the present invention. Referring to FIG. 1, the communication system 1 according to the embodiment of the present invention includes base stations 10A and 10B, a backbone network 12, user equipments 20A, 20B and 20X, and relay nodes 30A and 30B. The term "node" describes stations, devices, apparatuses, and equipment that relays a wireless signal from one device to another.

The base station 10 manages communication between the relay node 30 and the user equipment 20 located inside a cell formed by the base station 10. For example, the base station 10A manages scheduling information for communication with the user equipment 20X located inside the cell, and communicates with the user equipment 20X according to the scheduling information. Further, the base station 10A manages scheduling information for communication with the relay node 30A located inside the cell and scheduling information for communication between the relay node 30A and the user equipment 20A.

Note that management of the scheduling information may be performed in cooperation by the base station 10 and the relay node 30, may be performed in cooperation by the base station 10, the relay node 30 and the user equipment 20, or may be performed by the relay node 30.

The relay node 30 relays communication between the base station 10 and the user equipment 20 according to the scheduling information managed by the base station 10. Specifically, the relay node 30 receives a signal transmitted from the base station 10 and transmits the amplified signal to the user equipment 20 by using frequency/time according to the scheduling information in the downlink. With such a relay in the relay node 30, a signal-to-noise ratio is higher compared to directly transmitting a signal from the base station 10 to the user equipment 20 near the cell edge. A more detailed explanation of the relay node and how it interoperates with a base station and user equipment is described in JP Patent application 2010-040224, filed in the Japanese Patent Office on Feb. 25, 2010, and in JP 2010-040227, filed in the Japanese Patent Office on Feb. 25, 2010, the entire contents of both of which being incorporated herein by reference.

Likewise, in the uplink also, the relay node 30 relays a signal transmitted from the user equipment 20 to the base station 10 according to the scheduling information managed by the base station 10, thereby maintaining a high signal-to-noise ratio. Although the case where only the relay node 30A exists in the cell formed by the base station 10A, a plurality of relay nodes 30 may exist in the cell formed by the base station 10A.

Proposed as the types of the relay nodes 30 are Type 1 and Type 2. The relay node 30 of Type 1 has an individual cell ID and is allowed to manage its own cell. Thus, the relay node 30 of Type 1 operates in such a way that it is recognized as the base station 10 by the user equipment 20. However, the relay node 30 of Type 1 does not completely operate autonomously, and the relay node 30 performs relay communication within the range of resources allocated by the base station 10.

On the other hand, the relay node 30 of Type 2, differently from Type 1, does not have an individual cell ID and supports direct communication between the base station 10 and the user equipment 20. For example, a relay transmission technique using cooperative relay or network coding is being studied. The following table 1 shows characteristics of Type 1 and Type 2 under study.

TABLE 1

| Item | Type 1 | Type 2 |
|---|---|---|
| Decision | R1-091098 | R1-091632 |
| Type of Relay | L2 and L3 Relay | L2 |
| PHY Cell ID | Own cell ID | No cell ID |
| Transparency | Non transparent Relay node to UE | Transparent Relay node to UE |
| New cell | Create new cell (another eNB) | Not create new cell |
| RF parameters | Optimized parameters | N/A |
| HO | Inter cell HO (generic HO) | HO transparently to UE |
| Control Channel Generation | Generate synch. channel, RS, H-ARQ channel and scheduling information etc. | Not generate its own channel but decodes/forwards donor eNB's signal to UE |
| Backward compatibility | Support (appear as a Re1-8 eNB to Rel-8 UE) | Support (able to relay also to/from Rel-8 UE) |
| LTE-A (Forward compatibility) | Support (it appear differently than Rel-8 eNB to LTE-A UE) | ?? |
| Awareness to MS | ?? (>Re1-8 eNB to LTE-A UEs or Relay) | ?? |
| Cooperation | Inter cell cooperation | Intra cell cooperation |
| Backhaul utilization | Higher | Lower |
| Usage model | Coverage extension | Throughput enhancement and coverage extension |
| Cost | Higher | Lower |

The user equipment 20 communicates with the base station 10 directly or through the relay node 30 according to the scheduling information managed by the base station 10. Data transmitted or received by the user equipment 20 may be voice data, music data such as music, lectures or radio programs static image data such as photographs, documents, pictures or charts, or video data such as movies, television programs, video programs, game images or the like. Further, the user equipment 20 may be an information processing device having a radio communication function such as a mobile phone or a personal computer (PC).

A management server 16 is connected to each base station 10 through the backbone network 12. The management server 16 functions as a mobile management entity (MME). Further, the management server 16 may function as a serving gateway. The management server 16 receives management information indicating the status of cell formed by each base station 10 from the respective base stations 10 and controls communication in the cell formed by each base station 10 based on the management information. The function of the management server 16 may be incorporated into a plurality of physically separated structures in a distributed manner.

(Example of Resource Allocation to Each Link)

Resource allocation to each link is described hereinafter. In the following description, a communication path between the base station 10 and the relay node 30 is referred to as a relay link, a communication path between the relay node 30 and the user equipment 20 is referred to as an access link, and a direct communication path between the base station 10 and the user equipment 20 is referred to as a direct link. Further, a communication path toward the base station 10 is referred to as UL (uplink), and a communication path toward the user equipment 20 is referred to as DL (downlink). Communication in each link is based on OFDMA.

The relay node 30 separates the relay link and the access link by frequency or time in order to avoid interference between the relay link and the access link. For example, the relay node 30 may separate the relay link and the access link in the same direction by TDD (Time Division Duplexing) with use of a common frequency.

Figure 2:
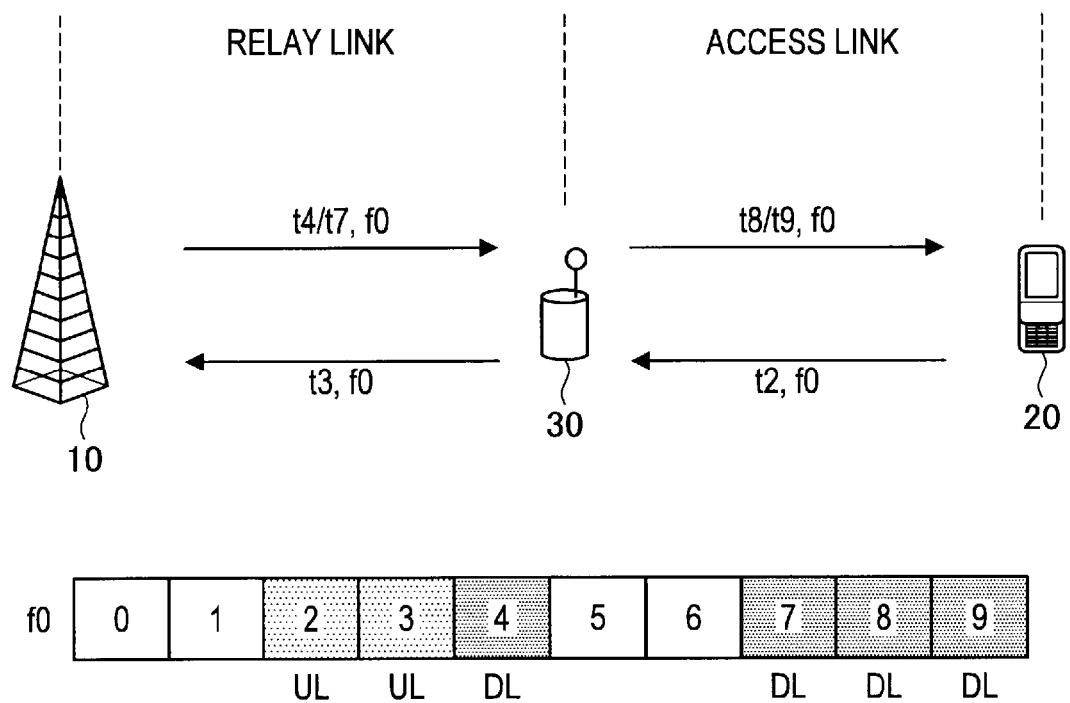
FIG. 2 is an explanatory view showing an example of resource allocation in the case of using the same frequency in UL and DL.

FIG. 2 is an explanatory view showing an example of resource allocation in the case of using the same frequency in UL and DL. Referring to FIG. 2, one radio frame is made up of subframes 0 to 9. Further, in the example shown in FIG. 2, the relay node 30 recognizes the subframes 8 and 9 as resources for DL of the access link according to a direction from the base station 10 and therefore relays a signal transmitted from the base station 10 to the user equipment 20 with use of the subframes 8 and 9.

Note that PSC (Primary Synchronization Channel) and SSC (Secondary Synchronization Channel), which are synchronous signals of the downlink, or PBCH (Physical Broadcast CHannel) is allocated to the subframes 0 and 5. Further, a paging channel is allocated to the subframes 1 and 6.

FIG. 3 is an explanatory view showing an example of resource allocation in the case of using different frequencies in UL and DL. Referring to FIG. 3, a frequency f0 is used for DL, and a frequency f1 is used for UL. Further, in the example shown in FIG. 3, the relay node 30 recognizes the subframes 6 to 8 of the frequency f0 as resources for DL of the access link according to a direction from the base station 10 and therefore relays a signal transmitted from the base station 10 to the user equipment 20 with use of the subframes 6 to 8 of the frequency f0.

Note that PSC and SSC, which are synchronous signals of the downlink, are allocated to the subframes 0 and 5 of the frequency f0 (for DL), and a paging channel is allocated to the subframes 4 and 9.

(Example of Format of Radio Frame)

Detailed examples of the frame format of DL radio frame and UL radio frame are described hereinafter with reference to FIGS. 4 and 5.

Figure 4:
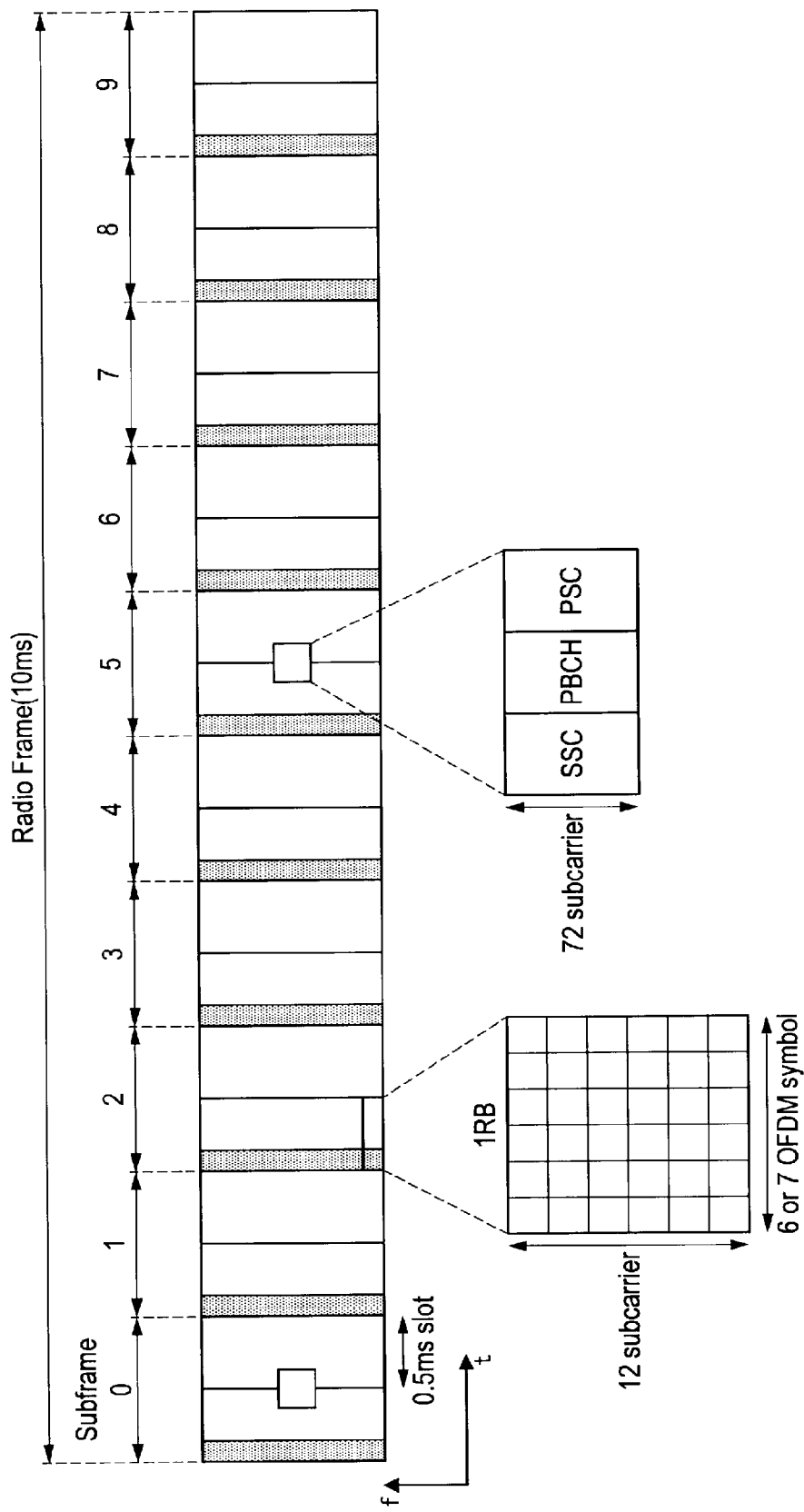
FIG. 4 is an explanatory view showing an example of a format of DL radio frame.

FIG. 4 is an explanatory view showing an example of the format of DL radio frame.

The DL radio frame is made up of subframes 0 to 9, each subframe is made up of two 0.5 ms slots, and each 0.5 ms slot is made up of seven OFDM (Orthogonal Frequency Division Multiplexing) symbols.

As shown in FIG. 4, a control channel such as PCFICH (Physical Control Format Indicator CHannel), PHICH (Physical Hybrid ARQ Indicator CHannel) or PDCCH (Physical Downlink Control CHannel) is present in the first to third OFDM symbols at the head of each subframe.

Each of the above channels contains the following information as an example.

PCFICH: The number of symbols of PDCCH related to Layer 1 and Layer 2

PHICH: ACK/NACK for PUSCH

PDCCH: Downlink control information. Scheduling information (format such as modulation scheme or coding rate) of PDSCH/PUSCH Further, one resource block (1RB), which is a minimum unit of resource allocation, is made up of six or seven OFDM symbols and 12 subcarriers. A demodulation reference (reference signal) is present in a part of the resource block.

Further, SSC, PBCH and PSC are present in the subframes 0 and 5. A free space in the radio frame shown in FIG. 4 is used as PDSCH (Physical Downlink Shared CHannel).

Figure 5:
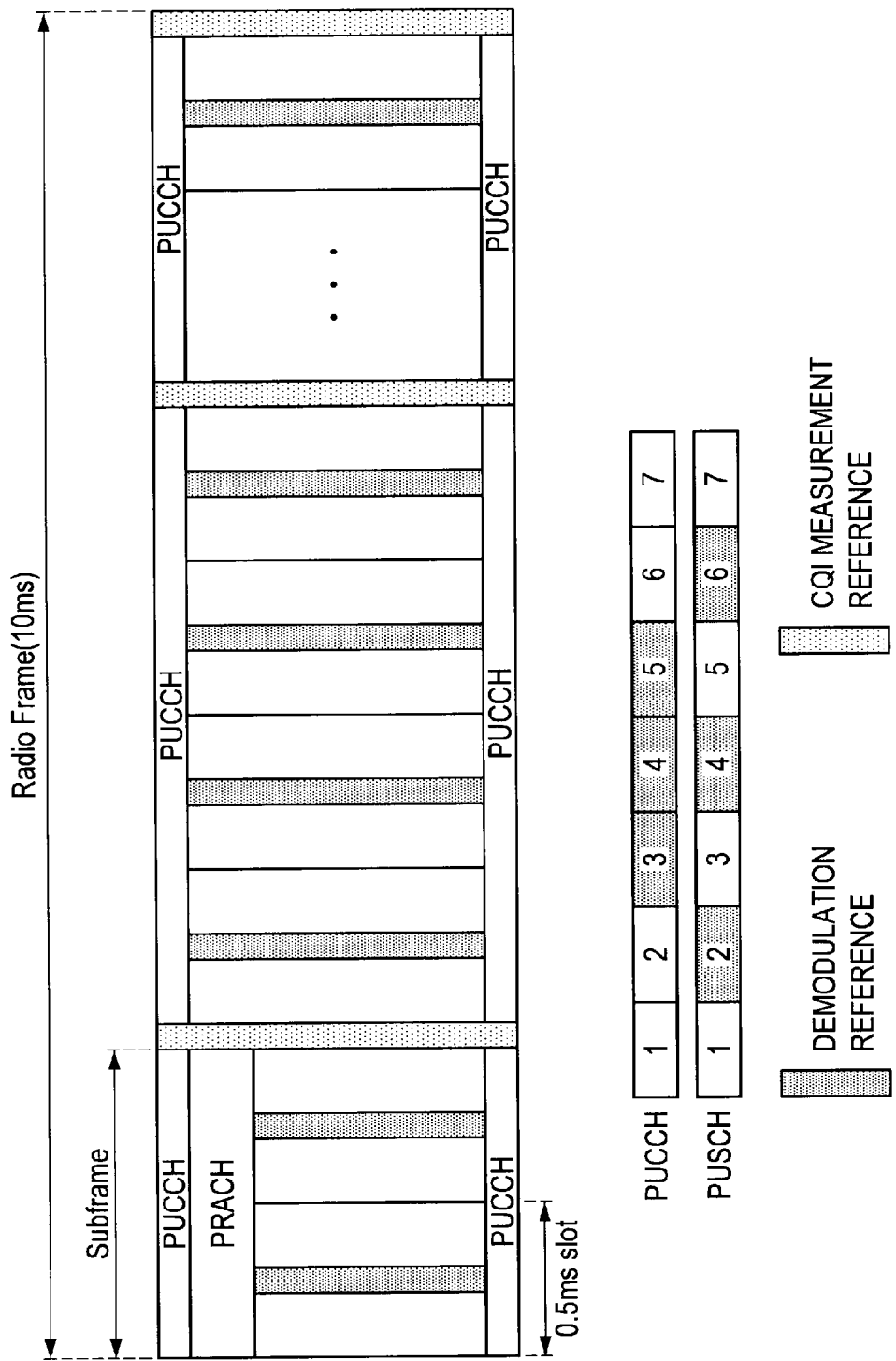
FIG. 5 is an explanatory view showing an example of a format of UL radio frame.

FIG. 5 is an explanatory view showing an example of the format of UL radio frame.

Like the DL radio frame, the UL radio frame is made up of subframes 0 to 9, each subframe is made up of two 0.5 ms slots, and each 0.5 ms slot is made up of seven OFDM symbols.

As shown in FIG. 5, a demodulation reference (reference signal) is present in each of the 0.5 ms slots, and a CQI measurement reference is present in a distributed manner. The base station 10 or the relay node 30 at the receiving end performs channel estimation by using the demodulation reference and demodulates a received signal according to the channel estimation result. Further, the base station 10 or the relay node 30 at the receiving end measures the CQI measurement reference and thereby acquires CQI with the relay node 30 or the user equipment 20 at the transmitting end.

Further, a free space in the radio frame shown in FIG. 5 is used as PUSCH (Physical Uplink Shared CHannel). Note that, upon receiving a request for CQI report, the user equipment 20 or the relay node 30 transmits the CQI report by using PUSCH.

(Connection Processing Sequence)

A connection processing sequence between the relay node 30 or the user equipment 20 and the base station 10 is described hereinafter with reference to FIG. 6.

Figure 6:
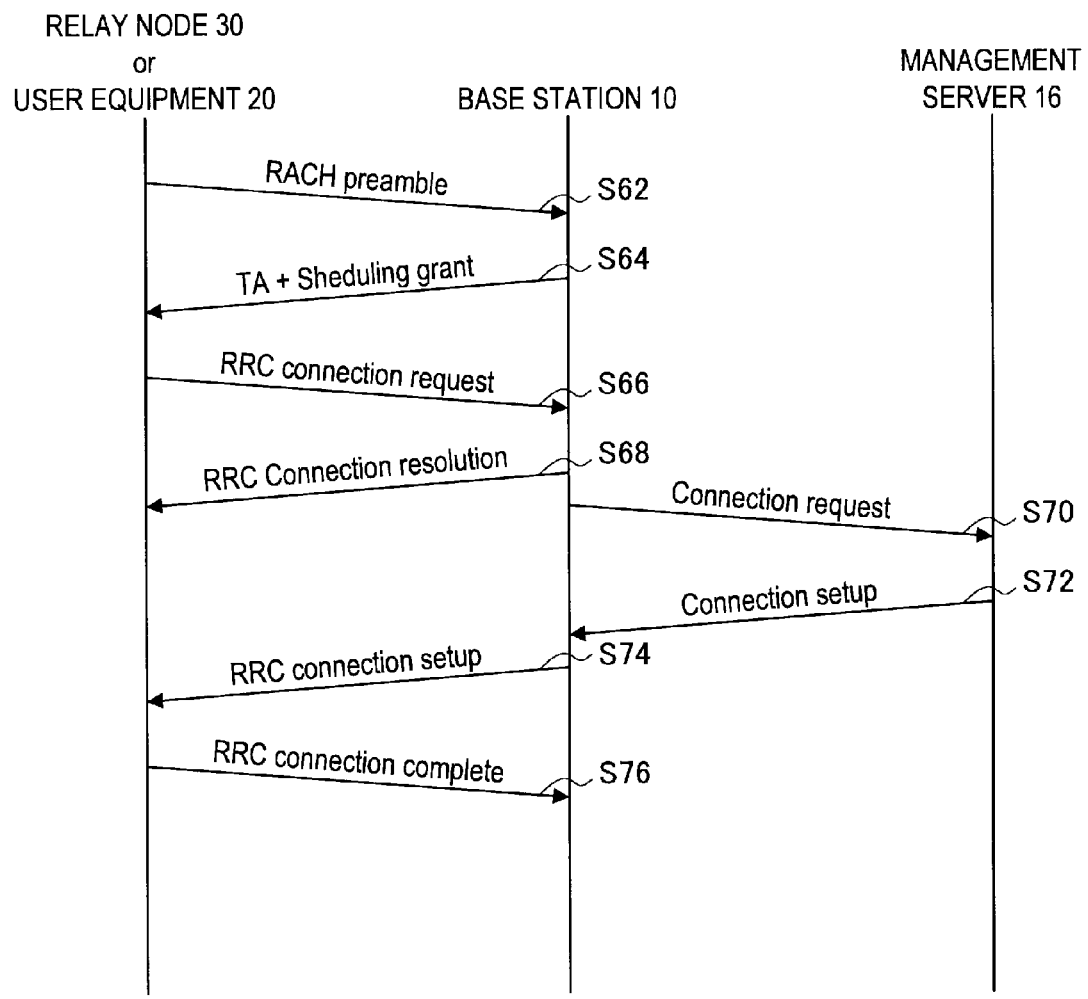
FIG. 6 is an explanatory view showing a connection processing sequence.

FIG. 6 is an explanatory view showing a connection processing sequence. Referring to FIG. 6, the relay node 30 or the user equipment 20 transmits RACH (Random Access CHannel) preamble to the base station 10 (S62). Receiving the RACH preamble, the base station 10 acquires TA (Timing Advance) information and transmits the TA information together with allocated resource information to the relay node 30 or the user equipment 20 (S64). For example, in the case where the transmission timing of the RACH preamble is known, the base station 10 may acquire a difference between the transmission timing and the reception timing of the RACH preamble as the TA information.

After that, the relay node 30 or the user equipment 20 transmits RRC connection request to the base station 10 by using resources indicated by the allocated resource information (S66). Receiving the RRC connection request, the base station 10 transmits RRC connection resolution indicating a transmission source of the RRC connection request (S68). The relay node 30 or the user equipment 20 can thereby confirm whether the base station 10 has received the RRC connection request.

Then, the base station 10 transmits connection request indicating that the relay node 30 or the user equipment 20 is making a request for service to the management server 16 that functions as MME (S70). Receiving the connection request, the management server 16 transmits information to be set to the relay node 30 or the user equipment 20 as connection setup (S72).

Then, the base station 10 transmits RRC connection setup to the relay node 30 or the user equipment 20 based on the connection setup from the management server 16 (S74), and the relay node 30 or the user equipment 20 makes connection setting. After that, the relay node 30 or the user equipment 20 transmits RRC connection complete indicating completion of connection setting to the base station 10 (S76).

Connection between the relay node 30 or the user equipment 20 and the base station 10 is thereby completed, and communication becomes available. The above-described connection processing sequence is just by way of illustration, and the relay node 30 or the user equipment 20 and the base station 10 may be connected by another sequence.

(MBSFN)

Hereinafter, MBSFN (Multimedia Broadcasting Single Frequency Network) transmission that is performed by the base station 10 and an exemplary operation of the relay node 30 in response to the MBSFN transmission are described.

MBSFN is the mode where a plurality of base stations 10 simultaneously transmits data in a broadcast manner at the same frequency. Therefore, in MBSFN, the relay node 30 of Type 1 that virtually operates as a base station transmits a control channel for DL or the like by using the same frequency as that of the base station 10. A specific flow of MBSFN transmission/reception processing is described hereinafter with reference to FIG. 7.

Figure 7:
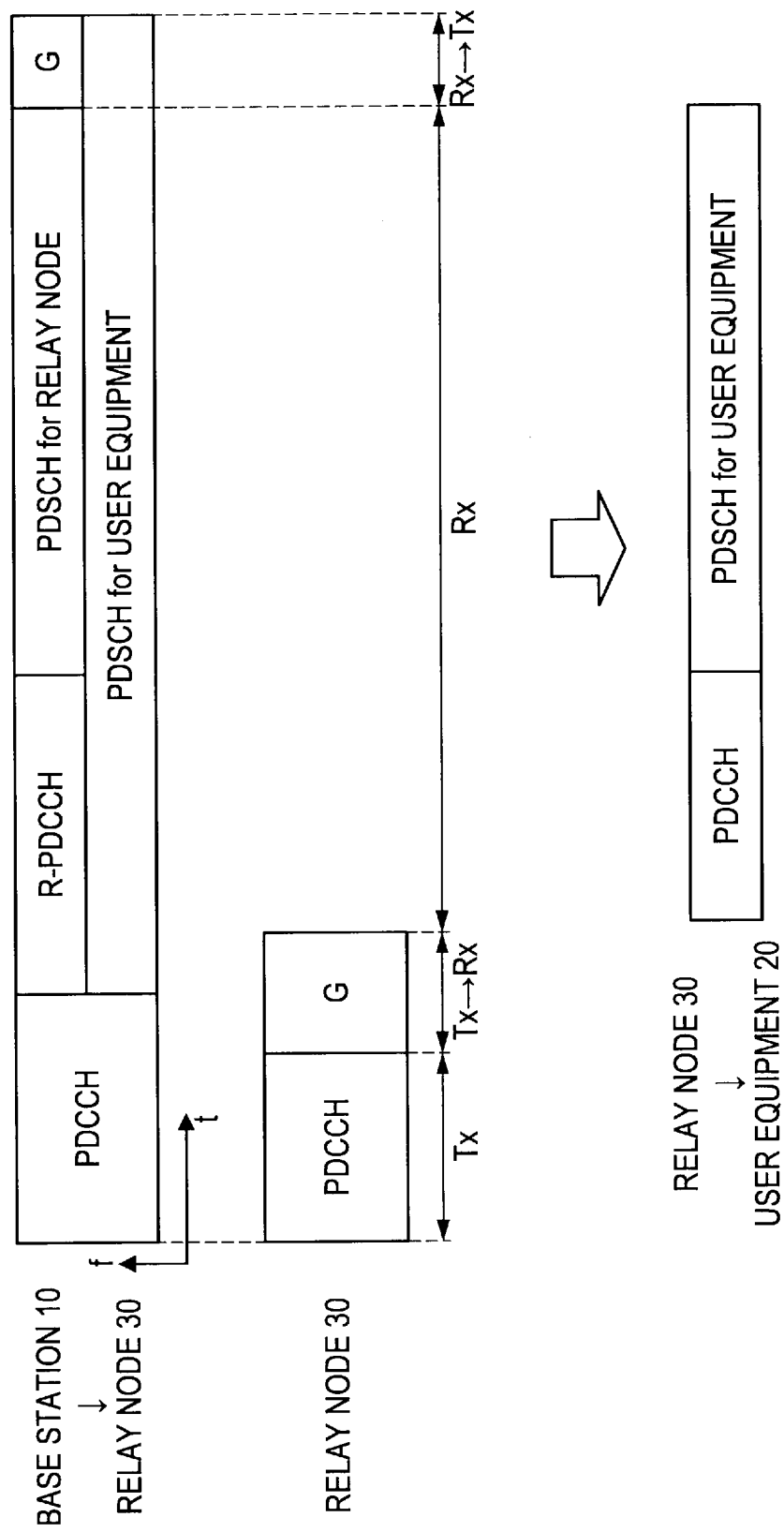
FIG. 7 is an explanatory view showing an illustrative example of MBSFN transmission/reception processing.

FIG. 7 is an explanatory view showing an illustrative example of MBSFN transmission/reception processing. First, as shown in FIG. 7, the base station 10 and the relay node 30 simultaneously transmit PDCCH. The base station 10 transmits, after PDCCH, PDSCH for the user equipment 20 and R-PDCCH for controlling a relay. After R-PDCCH, the base station 10 transmits PDSCH for the relay node 30 (relay target data). A non-transmission period comes after PDSCH for the relay node 30.

The relay node 30 receives, after transmitting PDCCH, PDSCH (relay target data) from the base station 10 subsequent to a switching period to reception processing. The relay node 30 then switches reception processing to transmission processing in the non-transmission period that comes after PDSCH (relay target data) from the base station 10. Further, in the next step, the relay node 30 adds PDCCH to decoded PDSCH (relay target data) and then transmits the data to the user equipment 20.

The existing user equipment that does not assume the existence of the relay node 30 can thereby make an advantage of the relay by the relay node 30 without confusion.

(Example of Frequency Allocation to Each Cell)

An example of frequency allocation to each cell in the case where a plurality of cells are adjacent is described hereinafter.

Figure 8:
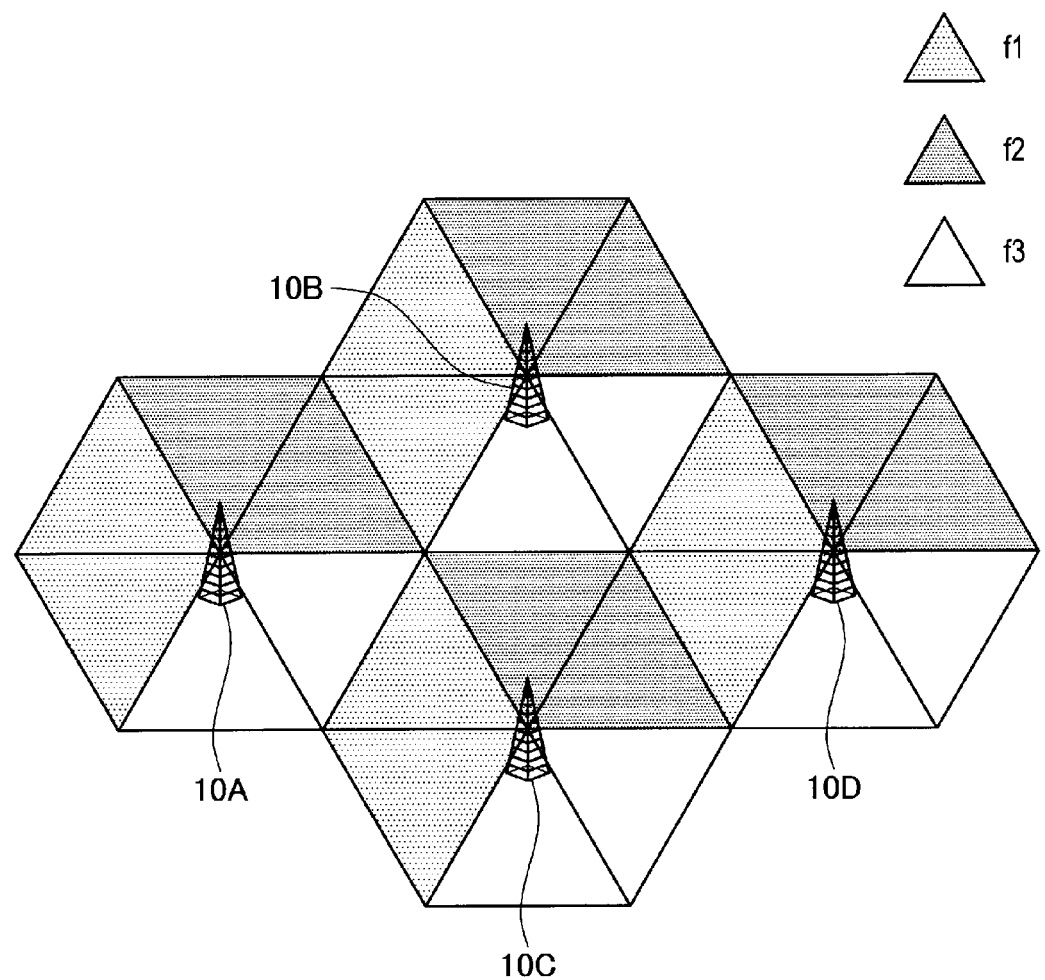
FIG. 8 is an explanatory view showing an example of frequency allocation in each cell.

FIG. 8 is an explanatory view showing an example of frequency allocation in each cell. In the case where each cell is made up of three sectors, frequencies f1 to f3 are allocated to the respective sectors as shown in FIG. 8, thereby suppressing the interference of frequencies at the cell boundary. Such allocation is particularly effective in a densely populated area with heavy traffic.

In LTE-A, in order to achieve end-to-end high-throughput, various novel techniques such as spectrum aggregation, network MIMO, uplink multi-user MIMO and relay technique are being studied. Therefore, with the advent of high-throughput novel mobile applications, there is a possibility that exhaustion of frequency resources appears as an issue in a suburban area also. Further, in the introduction of LTE-A, it is highly possible that the installation of the relay node 30 will be activated for the purpose of achieving infrastructure development at low costs.

<2. Illustrative Configuration of Communication System>

The basic configuration of the communication system 1 according to the embodiment is described above with reference to FIGS. 1 to 8. Hereinafter, an illustrative configuration of the communication system 1 according to the embodiment is described.

(2-1. Switching Between Spectrum Aggregation Mode and MIMO Mode)

Recently, it has been studied that a communication device (the relay node 30 or the user equipment 20) reserves a band of 20 MHz or more by spectrum aggregation that makes simultaneous use of discrete or sequential channels. However, in order to handle the dispersive channels by one branch (transmission/reception resources such as an antenna and an analog processing unit), a filter or FFT compatible with a high bandwidth is necessary. Further, the use of spectrum aggregation causes an increase in the number of channels allocated for communication with one communication device, which would raise a concern that a severe strain is placed on resources compared to MIMO communication.

Against the above background, the communication system 1 according to an embodiment has been invented. According to the embodiment, it is possible to simplify the configuration of each branch of a communication device and selectively use spectrum aggregation mode and MIMO mode in accordance with a traffic volume. Hereinafter, the user equipment 20 and the base station 10 that constitute the communication system 1 according to the embodiment are described in detail. Moreover, more detailed explanations of MIMO operation are provided in PCT International Publication WO 2004/030238, and U.S. Pat. No. 6,862,271, the entire contents of both of which being incorporated herein by reference.

Figure 9:
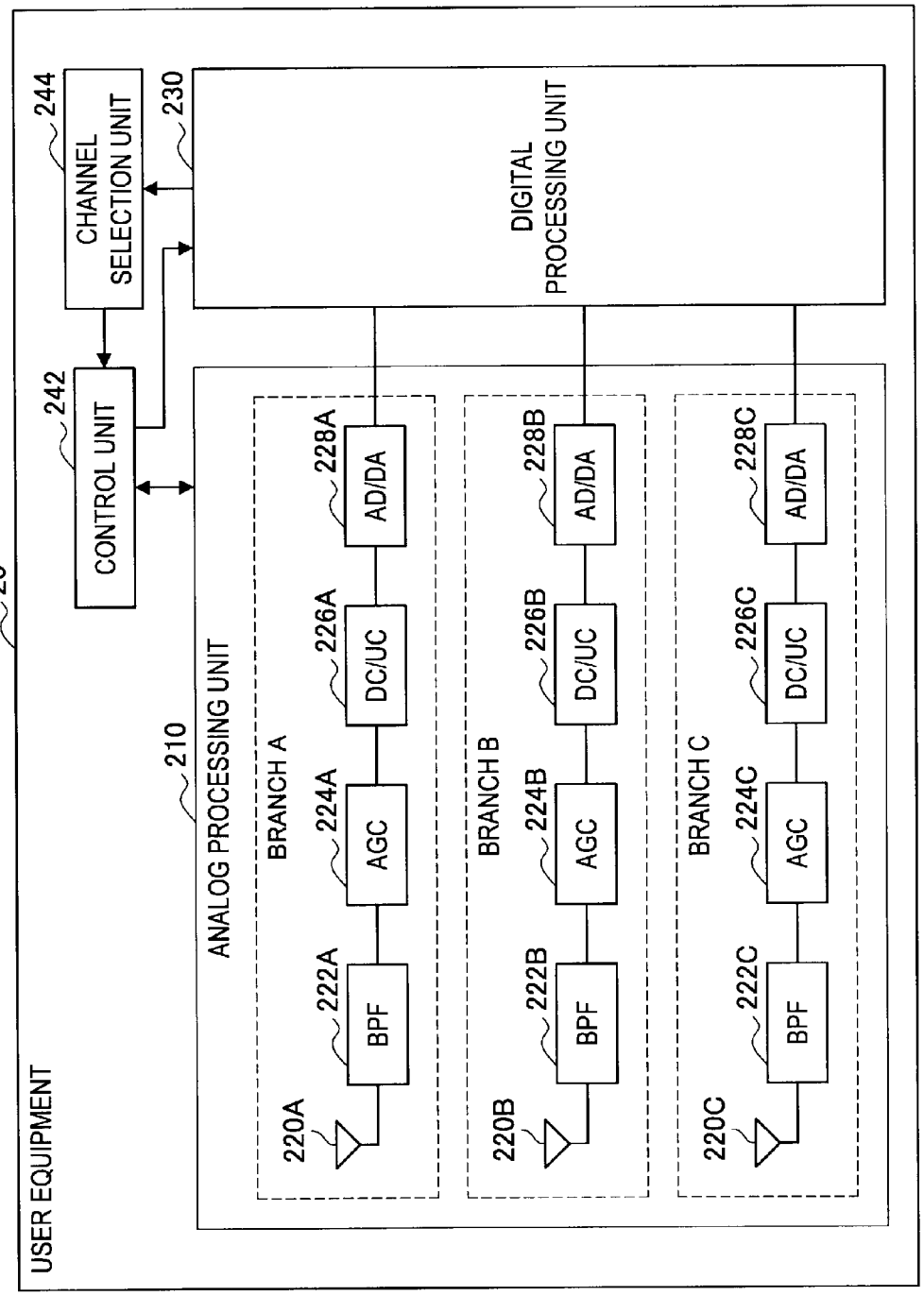
FIG. 9 is a functional block diagram showing a configuration of a user equipment according to an embodiment of the present invention.

FIG. 9 is a functional block diagram showing the configuration of the user equipment 20 according to the embodiment of the present invention. Referring to FIG. 9, the user equipment 20 includes an analog processing unit 210, a digital processing unit 230, a control unit 242, and a channel selection unit 244. The analog processing unit 210 is made up of a plurality of branches A, B and C.

Each branch includes an antenna 220 and a signal processing unit such as a BPF (Band-Pass Filter) 222, an AGC (Automatic Gain Control) 224, a DC (Down Converter)/UC (Up Converter) 226 and an AD/DA 228. The respective branches (transmission/reception resources) may include not only elements in the analog processing unit 210 but also elements in the digital processing unit 230 such as FFT and IFFT.

The antenna 220 receives a radio signal from the base station 10 or the relay node 30 and acquires an electrical high-frequency received signal. Further, the antenna 220 transmits a radio signal to the base station 10 or the relay node 30 based on a high-frequency transmission signal supplied from the BPF 222.

The BPF 222 passes certain frequency components of a high-frequency received signal acquired by the antenna 220. Further, the BPF 222 passes certain frequency components of a high-frequency transmission signal supplied from the AGC 224. The AGC 224 makes automatic gain control of a high-frequency received signal supplied from the BPF 222 and a high-frequency transmission signal supplied from the DC/UC 226.

The DC/UC 226 down-converts a high-frequency received signal supplied from the AGC 224 to a baseband received signal. Further, the DC/UC 226 up-converts a baseband transmission signal supplied from the AD/DA 228 to a high-frequency transmission signal.

The AD/DA 228 converts a baseband received signal supplied from the DC/UC 226 from analog to digital. Further, the AD/DA 228 converts a baseband transmission signal supplied from the digital processing unit 230 from digital to analog.

The digital processing unit 230 includes an FFT that performs fast Fourier transform on a baseband received signal supplied from each branch, a P (Parallel)/S (Serial), a demodulator, a decoder and so on as the elements for reception. Further, the digital processing unit 230 includes an encoder, a modulator, an S/P, an IFFT and so on as the elements for transmission, and supplies a baseband transmission signal on which a subcarrier signal is superimposed, for example, to the AD/DA 228. Further, the digital processing unit 230 has MIMO processing function that enables MIMO communication.

The channel selection unit 244 selects channels (or channel group) to be used for communication in spectrum aggregation mode. Inappropriate selection can cause a problem in the following cases:

When a channel group to be processed by a certain branch exceeds the limits of the capacity of the branch; i.e., when channels in the channel group to be processed are too dispersed.

When there is a large difference in propagation path characteristics between channels in a channel group to be processed by a certain branch, and the expected improvement in throughput is not achieved.

Therefore, the channel selection unit 244 makes channel selection by the following procedure:

(1) Acquire information (use channel information) such as the center frequency and the bandwidth of the respective channels used by the connected base station 10

(2) Determine resources (data rate) to be reserved for the user equipment 20

(3) Classify a plurality of channels used by the connected base station 10 as a channel group (4) Determine a combination of a channel group and a branch.

Specifically, in the above (3), the channel selection unit 244 classifies one or more than one channels which can be simultaneously processed by each branch as a group according to a settable center frequency, filter size, FFT size or the like. For example, the channel selection unit 244 classifies channels into groups in such a way that the bandwidth of each group does not exceed the bandwidth that can be handled by the FFT. Grouping of channels is specifically described hereinafter with reference to FIG. 10.

Figure 10:
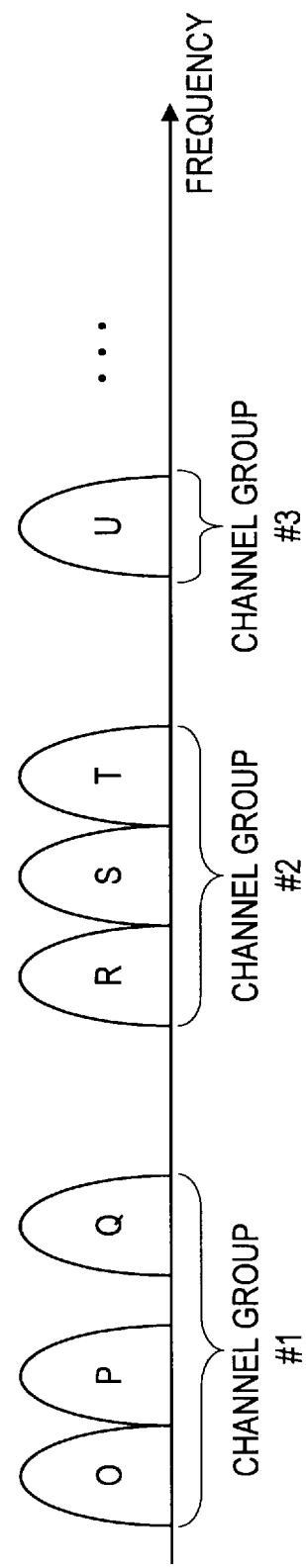
FIG. 10 is an explanatory view showing an illustrative example of grouping of channels.

FIG. 10 is an explanatory view showing an illustrative example of grouping of channels. In the example shown in FIG. 10, use channels of the base station 10 are O, P, Q, R, S, T, U and so on. In this case, the channel selection unit 244 classifies the channels O, P and Q as a channel group #1, classifies the channels R, S and T as a channel group #2, and classifies the channel U as a channel group #3, for example.

Further, regarding the above (4), each branch performs signal processing on known signals (e.g. reference signals) of all channels transmitted from the base station 10. Then, the channel selection unit 244 averages out the communication quality such as reception level or SINR of channels constituting each channel group and thereby acquires the communication quality of each channel group with respect to each branch. For example, the channel selection unit 244 averages out the communication quality of the channels O, P and Q by the branch A and thereby acquires the communication quality of the channel group #1.

Further, the channel selection unit 244 combines each branch and a channel group with the highest communication quality in each branch. For example, the channel selection unit 244 combines the branch A and the channel group #1, combines the branch B and the channel group #2, and combines the branch C and the channel group #3. Note that if one channel group has the highest communication quality in different branches, the channel selection unit 244 may combine the branch in which the communication quality of the channel group is higher and the channel group. Further, the channel selection unit 244 may combine the other branch and the channel group with the second highest communication quality in the other branch.

Referring back to FIG. 9, the configuration of the user equipment 20 is further described hereinafter. The control unit 242 of the user equipment 20 controls the overall operation in the user equipment 20, such as transmission processing, reception processing, and connection processing with the relay node 30 or the base station 10. For example, the control unit 242 performs TPC (Transmit Power Control), CQI report transmission control or the like.

Further, the control unit 242 requests the base station 10 to use the channel group selected by the channel selection unit 244 (i.e. the channel group combined with the branch). Although a method of the request is not particularly limited, exemplary methods are as follows Acquire channels for use by autonomously making a connection request by a given slot (RACH: Random Access CHannel) with respect to each selected channels. The connection request may be made from the branch combined with the channel.

Notify the selected channels by using one channel, not with respect to each selected channels. One channel may be any one of the selected channels or another channel. Further, one channel may be transmitted from the base station 10 through a broadcast channel such as PBCH or operating parameter information of an adjacent base station for handover. Further, the notification may be contained in any transmission signal (e.g. RACH) in a connection processing sequence (Call set up).

Based on the above request, the base station 10 allocates resources in the channels to the user equipment 20, and the base station 10 and the user equipment 20 can thereby communicate in the spectrum aggregation mode. For example, the base station 10 can transmit radio signals by using the channel groups #1 to #3, the user equipment 20 performs reception processing of the radio signal using the channel group #1 by the branch A, performs reception processing of the radio signal using the channel group #2 by the branch B, and performs reception processing of the radio signal using the channel group #3 by the branch C.

Note that the channel selection unit 244 and the control unit 242 may execute the selection of the channel group and the use request to the base station 10 as described above according to a command from the base station 10. Further, the configuration of the user equipment 20 is applicable also to the relay node 30. Specifically, the relay node 30 may include a plurality of branches which respectively transmit and receive signals using different channels to thereby realize spectrum aggregation. At this time, the relay node 30 may select a channel group with the suitable communication quality and request the base station 10 to use the selected channel group by the above-described method.

Hereinafter, the configuration of the base station 10 is described with reference to FIG. 11.

Figure 11:
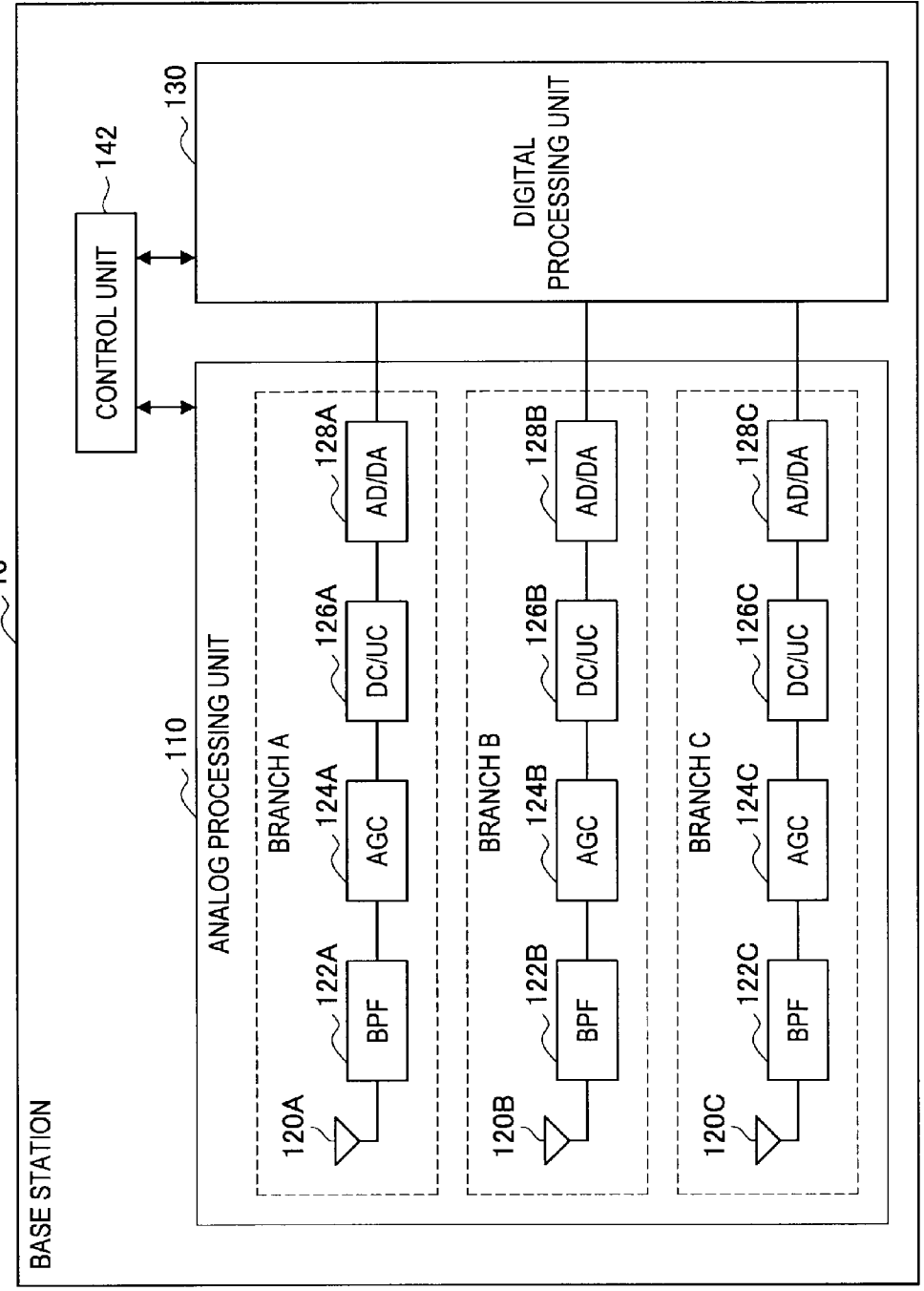
FIG. 11 is a functional block diagram showing a configuration of a base station according to an embodiment of the present invention.

FIG. 11 is a functional block diagram showing the configuration of the base station 10 according to the embodiment of the present invention. Referring to FIG. 11, the base station 10 includes an analog processing unit 110, a digital processing unit 130 and a control unit 142. Further, the analog processing unit 110 is made up of a plurality of branches A, B and C.

Each branch includes an antenna 120 and a signal processing unit such as a BPF 122, an AGC 124, a DC/UC 126 and an AD/DA 128. The respective branches may include not only elements in the analog processing unit 110 but also elements in the digital processing unit 130 such as FFT and IFFT. Further, although the base station 10 includes three branches in the example shown in FIG. 11, the number of branches in the base station 10 is not particularly limited.

The antenna 120 receives a radio signal from the user equipment 20 or the relay node 30 and acquires an electrical high-frequency received signal. Further, the antenna 120 transmits a radio signal to the user equipment 20 or the relay node 30 based on a high-frequency transmission signal supplied from the BPF 122.

The BPF 122 passes certain frequency components of a high-frequency received signal acquired by the antenna 120. Further, the BPF 122 passes certain frequency components of a high-frequency transmission signal supplied from the AGC 124. The AGC 124 makes automatic gain control of a high-frequency received signal supplied from the BPF 122 and a high-frequency transmission signal supplied from the DC/UC 126.

The DC/UC 126 down-converts a high-frequency received signal supplied from the AGC 124 to a baseband received signal. Further, the DC/UC 126 up-converts a baseband transmission signal supplied from the AD/DA 128 to a high-frequency transmission signal.

The AD/DA 128 converts a baseband received signal supplied from the DC/UC 126 from analog to digital. Further, the AD/DA 128 converts a baseband transmission signal supplied from the digital processing unit 130 from digital to analog.

The digital processing unit 130 includes an FFT that performs fast Fourier transform on a baseband received signal supplied from each branch, a P/S, a demodulator, a decoder and so on as the elements for reception. Further, the digital processing unit 130 includes an encoder, a modulator, an S/P, an IFFT and so on as the elements for transmission, and supplies a baseband transmission signal on which a subcarrier signal is superimposed, for example, to the AD/DA 128. Further, the digital processing unit 130 has MIMO processing function that enables MIMO communication.

The control unit 142 controls the overall communication in the cell formed by the base station 10, such as transmission processing, reception processing, connection processing with the relay node 30 or the user equipment 20, and management of scheduling information. For example, when use (connection) of a plurality of channels is requested from the relay node 30 or the user equipment 20, the control unit 142 may execute a connection processing sequence with the relay node 30 or the user equipment 20 and make scheduling of a resource block in the requested channels to the relay node 30 or the user equipment 20. The base station 10 can thereby realize spectrum aggregation that uses a plurality of channels requested from the relay node 30 or the user equipment 20. Note that, in spectrum aggregation, the control unit 142 may associate each of the requested channels to any branch of the base station 10 and communicate with the relay node 30 or the user equipment 20 by using the associated branch.

Further, the control unit 142 functions as a mode control unit that switches the spectrum aggregation mode to MIMO mode in accordance with the degree of congestion (traffic volume) of channels being used for spectrum aggregation. The mode switching is described herein below. More generally, when the channel usage (e.g., traffic volume, SNIR level, % of channel capacity, error rate, spectral occupancy, number of users, reserved etc.) is detected to be above a certain level the control unit 142 switches to the MIMO mode of operation.

As a communication technique for improving throughput, MIMO is used besides spectrum aggregation. MIMO is a technique that transmits a plurality of signal sequences in parallel from a plurality of transmission antennas, receives them with a plurality of receptions antennas, and separates the plurality of signal sequences by using the independence of propagation path characteristics between the plurality of transmission antennas and the plurality of receptions antennas.

However, in MIMO, there is a case where the independence of propagation path characteristics between the plurality of transmission antennas and the plurality of receptions antennas is low, and high throughput is unachievable in this case. On the other hand, in spectrum aggregation, throughput increases with the number of channels. Therefore, high throughput is more reliably achieved by spectrum aggregation than MIMO.

In view of the above, the control unit 142 gives a higher priority to the operation in the spectrum aggregation mode. This ensures higher throughput. On the other hand, when the traffic volume increases and the degree of congestion (or usage) becomes higher, it is desirable to reduce the occupied bandwidth per user. Therefore, the control unit 142 switches the spectrum aggregation mode to the MIMO mode according to an increase in the traffic volume.

Figure 12:
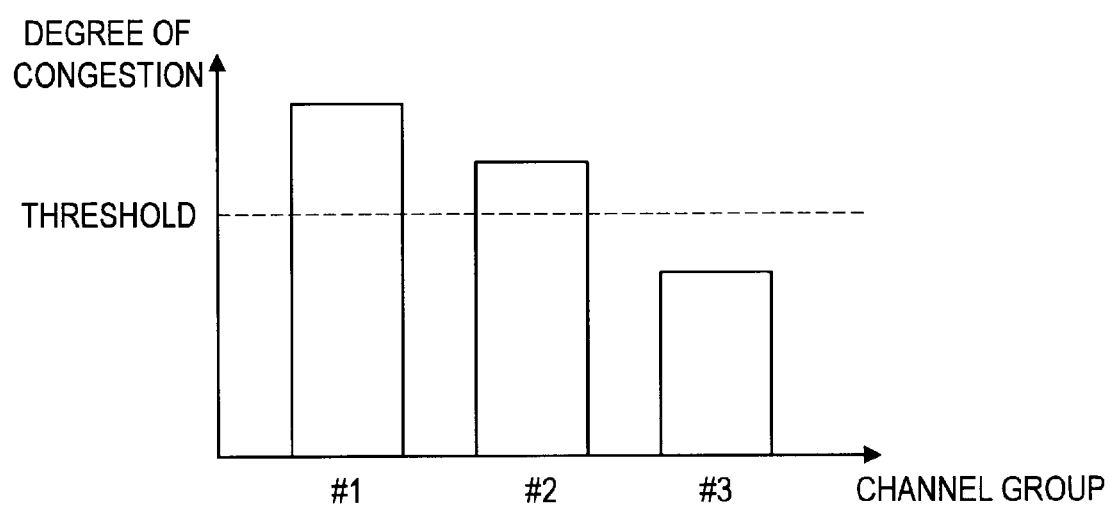
FIG. 12 is an explanatory view showing an example of the degree of congestion of a channel group.

For example, in the case where the channel groups #1 to #3 are used for spectrum aggregation communication with the relay node 30 or the user equipment 20 and when the degree of congestion of the channel groups #1 and #2 exceeds a threshold as shown in FIG. 12, the control unit 142 switches the spectrum aggregation mode to the MIMO mode. The control unit 142 may use the channel group #3 with the degree of congestion below the threshold in the MIMO mode. Note that the degree of congestion may be the absolute traffic volume in each channel group or the resource usage rate in each channel group. Further, the threshold of the degree of congestion may be different among channel groups.

Further, when the degree of congestion of a certain channel group exceeds the threshold but the degree of congestion of a plurality of channel groups remains below the threshold, the control unit 142 may continue to operate in the spectrum aggregation mode by excluding the certain channel group with the degree of congestion exceeding the threshold. For example, when the degree of congestion of only the channel group #1 exceeds the threshold, the control unit 142 may continue to perform spectrum aggregation by using the channel groups #2 and #3.

Further, upon switching to the MIMO mode, the control unit 142 may transmit trigger information for notifying (prompting) the switching to the relay node 30 or the user equipment 20 which is the other end of communication by spectrum aggregation. For example, the control unit 142 may transmit the trigger information with use of PDCCH or PDSCH. Further, the trigger information may contain channel information (center frequency, bandwidth etc.) used for MIMO communication or information indicating switching timing.

The control unit 242 of the relay node 30 or the user equipment 20 can thereby switch the transmission/reception mode of the analog processing unit 210 and/or the digital processing unit 230 to the MIMO mode based on the trigger information. Note that the analog processing unit 210 and/or the digital processing unit 230 waits for receiving a MIMO preamble upon switching to the MIMO mode.

The configurations of the user equipment 20 and the base station 10 are described above. Hereinafter, a series of flow for switching of the transmission/reception mode is described with reference to FIG. 13.

Figure 13:
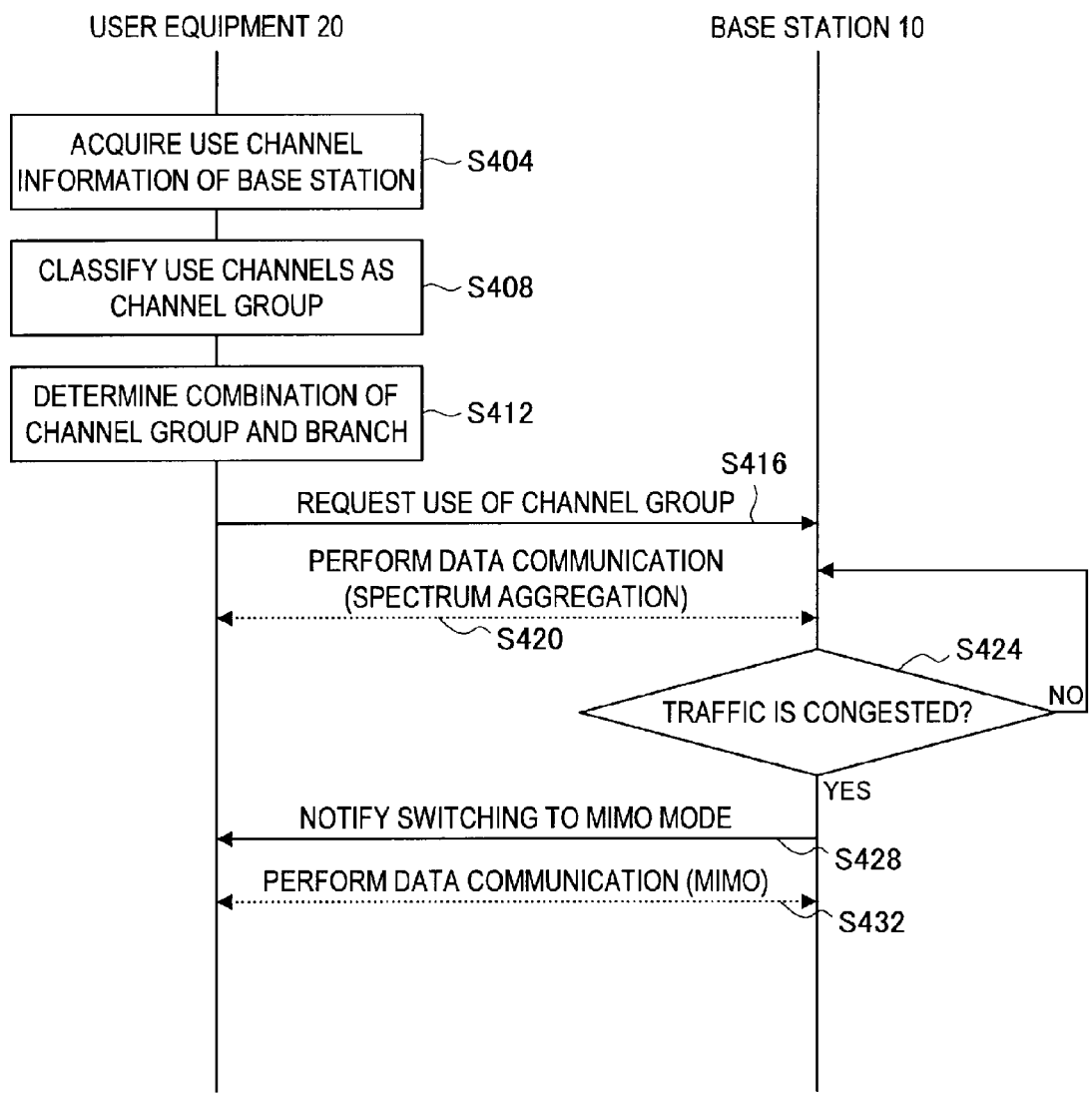
FIG. 13 is a sequence chart showing a flow for switching of transmission/reception mode.

FIG. 13 is a sequence chart showing a flow for switching of the transmission/reception mode. First, the user equipment 20 acquires information of a plurality of channels used by the base station 10 in response to a command from the base station 10, for example (S404). After that, the user equipment 20 classifies the plurality of channels used by the base station 10 into channel groups (S408). Specifically, the user equipment 20 classifies one or more than one channels which can be simultaneously processed by each branch as one channel group.

Then, the user equipment 20 determines a combination of each branch and a channel group with the highest communication quality in each branch (S412), and requests the base station 10 to use the channel group whose combination with the branch is determined (S416). After that, the base station 10 performs connection processing with the user equipment 20 and allocates a resource block in the requested channels to the user equipment 20, and the base station 10 and the user equipment 20 can thereby perform data communication by spectrum aggregation (S420).

After that, when the degree of congestion of the traffic in the cell exceeds a certain criterion (YES in S424), the base station 10 transmits trigger information indicating switching from the spectrum aggregation mode to the MIMO mode to the user equipment 20 (S428). Based on the trigger information, the user equipment 20 switches the transmission/reception mode to the MIMO mode and then performs data communication with the base station 10 by MIMO (S432). Note that, when the congestion of the traffic in the cell is reduced, the base station 10 may give a command to execute the processing from S404 to the user equipment 20 for switching to the spectrum aggregation mode.

As described above, when operating in the spectrum aggregation mode, the base station 10 switches the transmission/reception mode to the MIMO mode according to an increase in the traffic volume. It is thus possible to ensure high throughput by the spectrum aggregation mode when the traffic volume is low, and reduce the occupied bandwidth per user by the MIMO mode when the traffic volume increases.

(2-2. Multi-Link Connection)

When there are more available resources in another base station 10 than in the connected base station 10, the relay node 30 can switch the relay link to that base station 10 to thereby make effective use of the resources.

However, if a connection processing sequence (Call set up) with another base station 10 is performed each time switching the relay link, a switching delay due to the multiprocedure occurs. In light of this, the relay node 30 according to the embodiment creates multi-link connection with a plurality of base stations 10 with use of a plurality of branches to thereby reduce the switching delay. This is described in detail below.

First, the relay node 30 acquires use channel information (center frequency, bandwidth etc.) of a plurality of connectable base stations 10. Then, the relay node 30 makes Call set up with the plurality of connectable base stations 10 and completes the procedure up to RRC connection complete. The relay node 30 is thereby in multi-link connection with the plurality of base stations 10.

Figure 14:
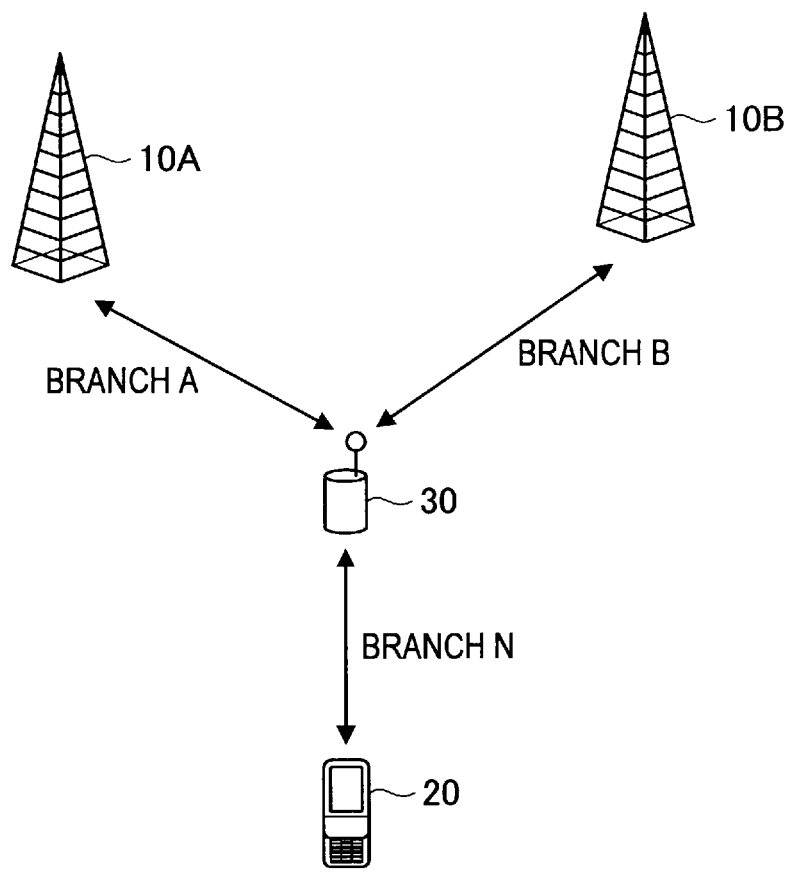
FIG. 14 is an explanatory view showing an illustrative example of multi-link connection of a relay node.

FIG. 14 is an explanatory view showing an illustrative example of multi-link connection of the relay node 30. In the example shown in FIG. 14, the relay node 30 is in multi-link connection with the base station 10A and the base station 10B. Note that the relay node 30 can make Call set up in parallel with use of a plurality of branches (or links). For example, as shown in FIG. 14, the relay node 30 may simultaneously make Call set up with the base station 10A with use of the branch A (or link A) and Call set up with the base station 10B with use of the branch B (or link B).

After that, the relay node 30 uses the relay link with the highest gain among the relay links with the plurality of base stations 10. For example, if the gain of the relay link with the base station 10A is higher than the gain of the relay link with the base station 10B in the example shown in FIG. 14, the relay node 30 selects use of the relay link with the base station 10A. Specifically, the relay node 30 relays communication related to the user equipment 20 by using the relay link with the base station 10A, and sets the relay link with the base station 10B as a standby link.

The base station 10 may add a specifier that specifies whether the relay link with the connected relay node 30 is a standby link or not to an interface (S1-MME IF) between the management server 16 (MME) and the base station 10. For example, in the example shown in FIG. 14, the base station 10B may add the specifier that specifies that the relay link with the relay node 30 is a standby link to the interface with the management server 16. The management server 16 or the base station 10 can thereby perform processing according to whether each relay link is a standby link or not. For example, the management server 16 or the base station 10 may give a higher priority to scheduling of the relay link which is not a standby link, and may approve a request related to a standby link if there are available resources. Further, the relay node 30 may use different branches for different links. For example, the relay node 30 may use the branch A for the relay link with the base station 10A, use the branch B for the relay link with the base station 10B, and use the branch N (or link N) for the access link with the user equipment 20.

After that, when the necessity for reducing the traffic or allocating resources or the like arises, the relay node 30 selects use of the standby link. For example, the relay node 30 may switch the relay link for use from the relay link with the base station 10A to the relay link with the base station 10B. Note that the relay node 30 may take necessary steps for obtaining resources related to the relay link with the base station 10B while relaying communication related to the user equipment 20 by using the relay link with the base station 10A. For example, the relay node 30 may make advance contact with the management server 16 through the base station 10 about resources intended to be obtained (resources likely to be switched). It is thereby expected to instantaneously respond to a request for obtaining resources from the relay node 30.

By the above manner, it is possible to reduce the delay time from the rise of the necessity to switch the relay link to the switching of the relay link. The same procedure is applicable to the access link also. Specifically, the user equipment 20 can reduce the switching delay of the access link by creating multi-link connection with a plurality of connectable relay nodes 30.

Figure 15:
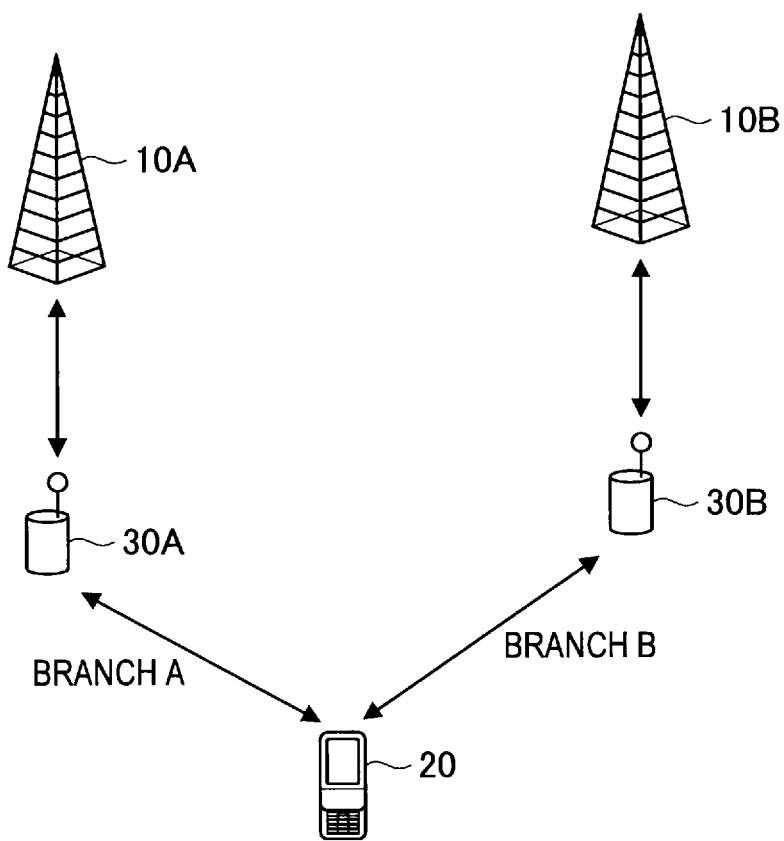
FIG. 15 is an explanatory view showing an illustrative example of multi-link connection of user equipment.

FIG. 15 is an explanatory view showing an illustrative example of multi-link connection of the user equipment 20. In the example shown in FIG. 15, the relay node 30A is connected with the base station 10A, the relay node 30B is connected with the base station 10B, and the user equipment 20 is in multi-link connection with the relay node 30A and the relay node 30B. In this case, the user equipment 20 can switch the access link for use between the access link with the relay node 30A and the access link with the relay node 30B according to need.

(2-3. Combination of Comp and Spectrum Aggregation)

Recently, CoMP (Coordinated Multipoint Transmission) has been studied as a technique of improving the link tolerance with respect to user equipment existing at the cell edge. Comp is a technique in which a plurality of adjacent base stations simultaneously transmit the same signal with use of the same channel. An embodiment that combines Comp and spectrum aggregation is described hereinafter.

EXAMPLE 1

In this example, when the traffic of a certain base station 10 is congested and a plurality of channels are not allocable to one user equipment 20, the base station 10 transmits a signal to the user equipment 20 by using one channel and, simultaneously, a nearby base station 10 transmits a signal to the user equipment 20 by using a different channel. Then, the relay node 30 receives the signals that are transmitted from a plurality of base stations 10 using different channels and transmits them to the user equipment 20. It is thereby possible to improve the throughput of communication related to the user equipment 20. This is specifically described hereinafter with reference to FIGS. 16 and 17.

Figure 16:
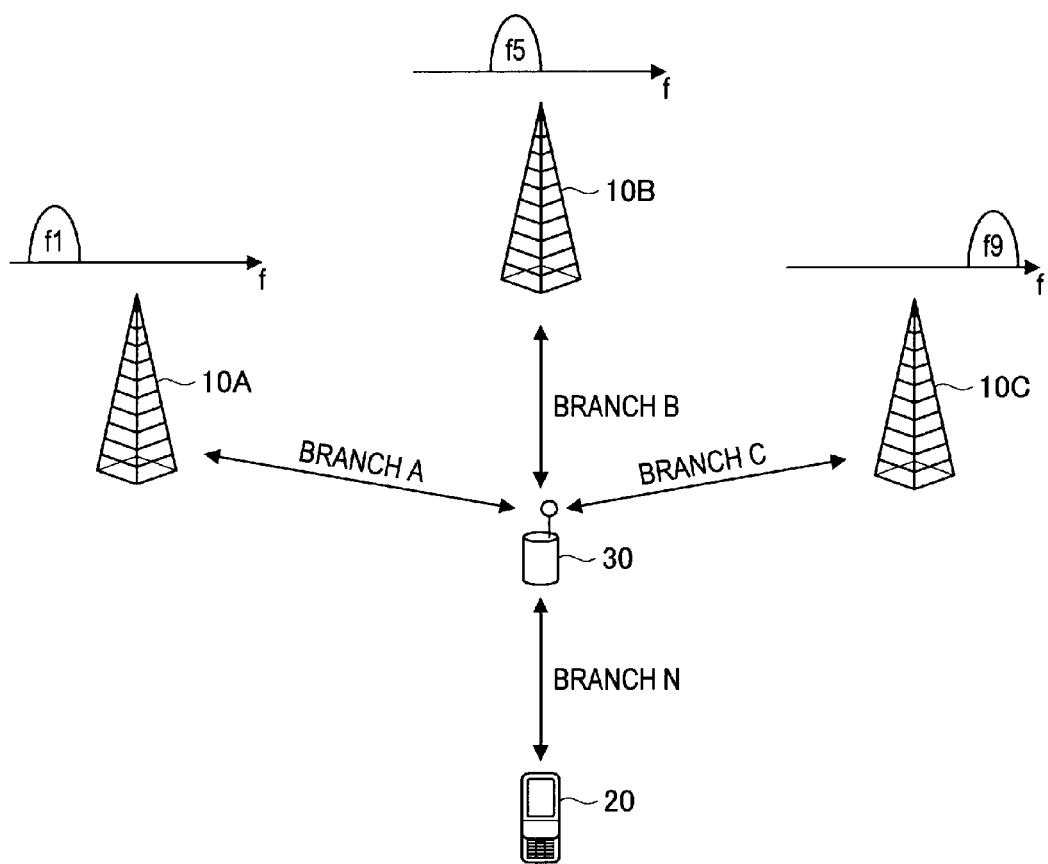
FIG. 16 is an explanatory view showing an example of a combination of Comp and spectrum aggregation.

FIG. 16 is an explanatory view showing an example of a combination of Comp and spectrum aggregation. As shown in FIG. 16, the base station 10A transmits a signal to the user equipment 20 by using f1 and, simultaneously, the base station 10B and the base station 10C transmit signals to the user equipment 20 by using f5 and f9, respectively.

Then, the relay node 30 receives the signals transmitted from the respective base stations 10 and transmits them to the user equipment 20. The relay node 30 may perform communication with the respective base stations 10 by using different branches. For example, the relay node 30 may communicate with the base station 10A by using the branch A, communicate with the base station 10B by using the branch B, and communicate with the base station 10C by using the branch C.

Figure 17:
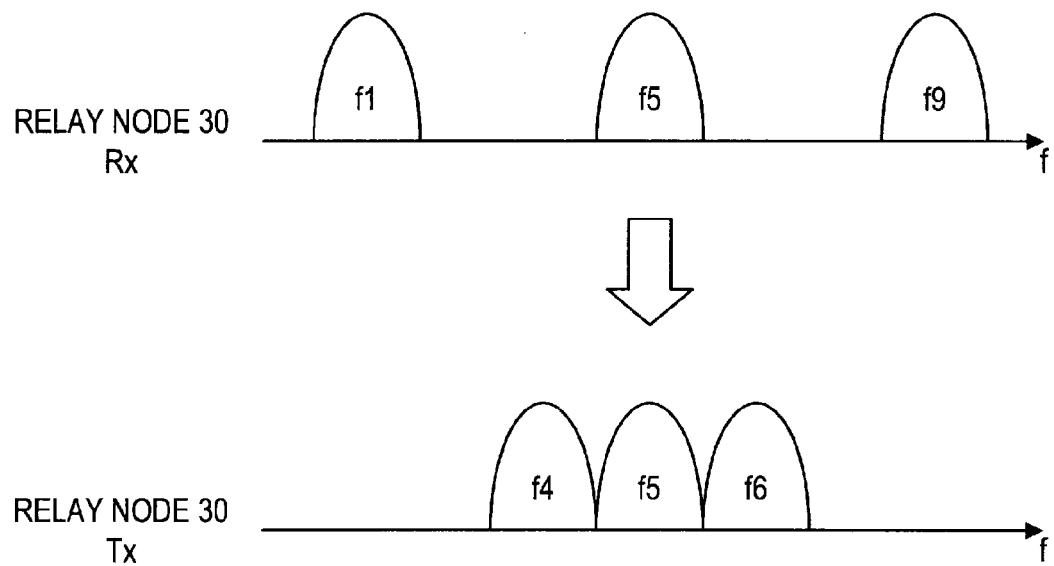
FIG. 17 is an explanatory view showing relay transmission by a relay node.

Further, although the relay node 30 receives signals to the user equipment 20 from the respective base stations 10 with discrete channels in the frequency domain, the relay node 30 relays the signals to the user equipment 20 by using less dispersed channels. For example, when the relay node 30 receives signals with channels f1, f5 and f9 which are discrete in the frequency domain as shown in FIG. 17, the relay node 30 may relay the signals to the user equipment 20 by using channels f4, f5 and f6 which are consecutive in the frequency domain. Because the user equipment 20 can thereby receive the signals with the channels f4, f5 and f6 which are consecutive in the frequency domain, it is possible to reduce the processing load of the user equipment 20.

Although the case where the number of channels for transmission is the same as the number of channels for reception is shown in FIG. 17, the number of channels for transmission may be smaller than the number of channels for reception. For example, the number of channels for reception may be three, and the number of channels for transmission may be two. In this case, a coding rate in the channels for transmission may be set higher than a coding rate in the channels for reception. Further, the number of channels for transmission may be one.

Further, a method of selecting a channel to be used for transmission is not particularly limited. For example, a channel to be used for transmission may be selected from channels close to the frequency band in which high SINR is obtained with the user equipment 20.

EXAMPLE 2

In this example, the base station 10 transmits signals to the user equipment 20 belonging thereto with a plurality of channels by spectrum aggregation. Then, a nearby base station 10 also transmits a signal in the channel with a large attenuation among the signals in the plurality of channels transmitted from the base station 10, and the relay node 30 relays the signal to the user equipment 20. It is thereby possible to strengthen the signal transmitted from the base station 10. This is specifically described hereinafter with reference to FIGS. 18 and 19.

Figure 18:
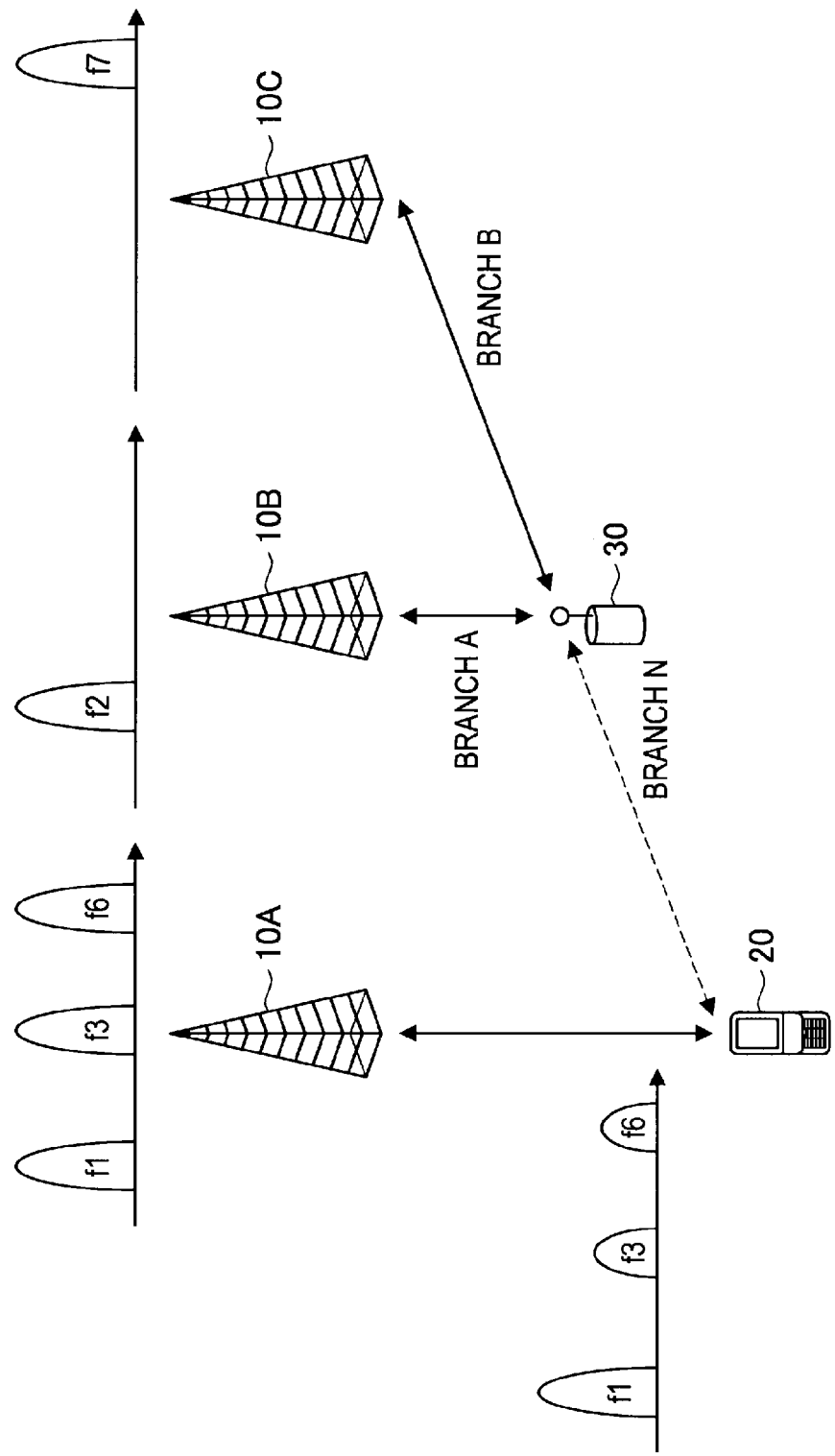
FIG. 18 is an explanatory view showing an example of a combination of Comp and spectrum aggregation.

FIG. 18 is an explanatory view showing an example of a combination of Comp and spectrum aggregation. As shown in FIG. 18, the base station 10A transmits signals to the user equipment 20 by using f1, f3 and f6. If the attenuation of f3 and f6 is large (when needed SNIR becomes not satisfied), the base station 10B and the base station 10C also transmit the signals that are transmitted by the base station 10A by using f3 and f6.

Figure 19:
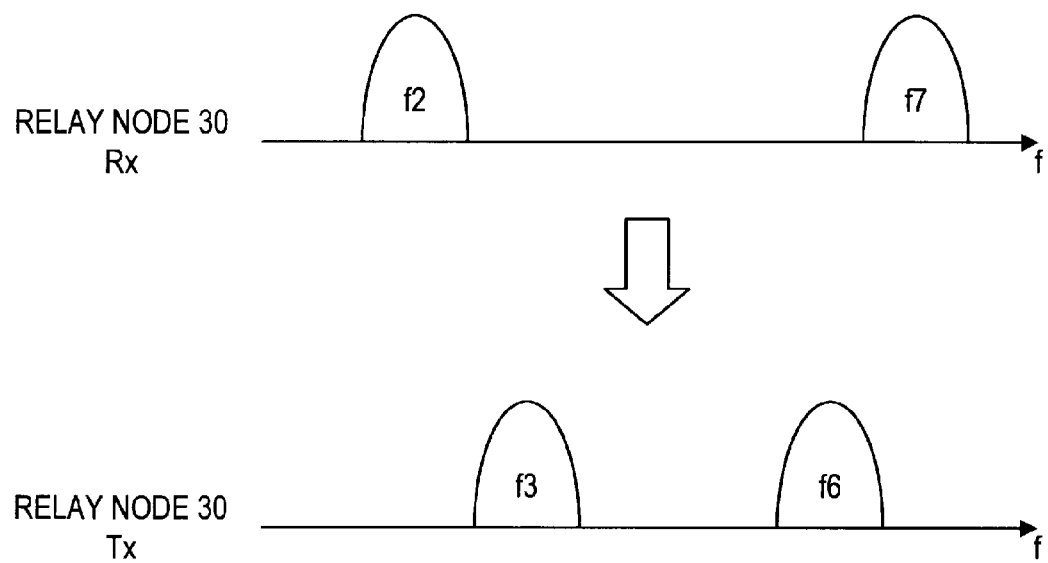
FIG. 19 is an explanatory view showing relay transmission by a relay node.

For example, the signal transmitted by the base station 10A with use of f3 is transmitted also by the base station 10B with use of f2, and the signal transmitted by the base station 10A with use of f6 is also transmitted by the base station 10C with use of f7. Then, as shown in FIG. 19, the relay node 30 transmits the signal received from the base station 10B with f2 to the user equipment 20 with use of f3 and transmits the signal received from the base station 10C with f7 to the user equipment 20 with use of f6. In this configuration, it is possible to strengthen the signals transmitted from the base station 10A by using f3 and f6. Although the case where the base stations 10B and 10C strengthen the signals by using frequencies different from that of the base station 10A is described above, the base stations 10B and 10C may strengthen the signals by using the same frequency as that of the base station 10A. For example, the base station 10B may use f3, and the base station 10C may use f6.

Further, in both the example 1 and the example 2, the management server 16 (MME/Serving Gateway) that monitors the respective links among the base station 10, the relay node 30 and the user equipment 20 serves an important role. Further, in the example 1, information for making spectrum aggregation between a plurality of adjacent base stations 10 in cooperation with each other is transmitted and received by the X2 interface between the base stations 10 and the S1 interface between the base station 10 and the management server 16. The information may be channel measurement report list with respect to each channel used for spectrum aggregation, position information and capability (bandwidth that can be transmitted and received at a time etc.) of the relay node 30 or the user equipment 20, extra resource information of each base station 10 or the like. In the example 2 also, information for strengthening spectrum aggregation channels is transmitted and received by the X2 interface and the S1 interface.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, it is not always necessary to execute the respective steps in the processing of the communication system 1 in this specification in chronological order according to the sequence shown in the sequence charts. For example, the respective steps in the processing of the communication system 1 may be executed in the sequence different from the sequence shown in the sequence charts or may be executed in parallel.

Furthermore, it is possible to create a computer program that causes hardware such as a CPU, ROM and RAM incorporated in the base station 10, the user equipment 20 and the relay node 30 to function equally to the respective elements of the base station 10, the user equipment 20 and the relay node 30 described above. Further, a memory medium that stores such a computer program may be provided.

REFERENCE SIGNS LIST

10A, 10A, 10B, 10C Base station
20 User equipment
30, 30A, 30B Relay node
110, 210 Analog processing unit
130, 230 Digital processing unit
142, 242 Control unit
244 Channel selection unit

The invention claimed is:

1. A wireless communication station comprising:
    a plurality of antennas configured to receive and transmit wireless signals between the wireless communication station and at least one other device;
    a transceiver coupled to said plurality of antennas, said transceiver being MIMO compatible and spectrum aggregation compatible; and
    a controller that is triggered to switch between a MIMO mode of operation and a spectrum aggregation mode of operation, based on a level of detected channel usage.

2. The communication station of claim 1, wherein said transceiver is a multichannel transceiver, each channel in said multichannel transceiver having a separate analog processing section.

3. The communication station of claim 1, wherein said wireless communication station is a base station.

4. The communication station of claim 3, wherein said base station further includes a detector configured to detect the level of channel usage and prepare an indicator that is transmitted to another device to trigger the another device to operate in the MIMO mode of operation or the spectrum aggregation mode of operation based on the level of channel usage detected.

5. The communication station of claim 1, wherein said wireless communication station is a relay node.

6. The communication station of claim 5, wherein said relay node is configured to receive a signal, that indicates whether the controller is to switch between the MIMO mode of operation and the spectrum aggregation mode of operation based on the level of channel usage detected by at another device.

7. The communication station of claim 1, wherein said controller includes a usage detector that triggers a mode change from said spectrum aggregation mode of operation to said MIMO mode of operation when said level of channel usage is above a predetermined threshold.

8. The communication station of claim 1, wherein said wireless communication station is a relay node, said relay node being configured to communicate with different base stations using different communication modes of operation than a communication mode used by the relay node to communicate with user equipment.

9. The communication station of claim 8, wherein said transceiver is configured to receive a plurality of different transmissions from a plurality of base stations and relay information in said plurality of transmissions to a single user equipment over a single communication link.

10. The communication station of claim 8, wherein said relay node is further configured to receive signals from a first base station using spectrum aggregation and combine information from said first base station with information received from a second base station via a different communication link, and forward the information from the first base station with the information from the second base station in one signal to said user equipment.

11. The communication station of claim 1, wherein said controller is configured to make a request of a base station to assign a channel group from within a plurality of different candidate communication channels.

12. A method for exchanging information in a wireless communication system comprising:
    receiving signals through multiple antennas from a plurality of different signal sources;
    combining said signals and forming an aggregate set of information;
    forming a transmission signal including said aggregate set of information;
    checking for an indication of channel usage being above a predetermined level, and transmitting said aggregate set of information via MIMO transmission when said usage is detected in a communication channel as being above said predetermined level, and
    transmitting said aggregate set of information in a spectrum aggregation transmission mode when said usage is detected as being below said predetermined level.

13. The method of claim 12, further comprising:
    detecting the level of channel usage within said communication channel and comparing said level of channel usage against the predetermined level; and
    generating a trigger signal to trigger a switch between a MIMO mode of operation and a spectrum aggregation mode of operation, depending on a level of usage detected in said detecting step.

14. The method of claim 12, further comprising:
    relaying information in said aggregate set of information to a user equipment.

15. The method of claim 14, wherein said relaying step includes using a different signaling protocol than a signaling protocol used with signals received by the relay node.

16. A non-transitory computer readable medium having instructions that when executed by a processor implement steps of:
    receiving signals through multiple antennas from a plurality of different signal sources;
    combining said signals and forming an aggregate set of information;
    forming a transmission signal including said aggregate set of information;
    checking for an indication of channel usage being above a predetermined level, and transmitting said aggregate set of information via MIMO transmission when said usage is detected in a communication channel as being above said predetermined level, and
    transmitting said aggregate set of information in a spectrum aggregation transmission mode when said usage is detected as being below said predetermined level.

17. A wireless communication station comprising:
    a plurality of antennas configured to receive and transmit wireless signals between the wireless communication station and at least one other device;
    a transceiver coupled to said plurality of antennas, said transceiver being MIMO compatible and spectrum aggregation compatible; and
    means for switching between a MIMO mode of operation and a spectrum aggregation mode of operation based on a level of detected channel usage.

18. The communication station of claim 1, further comprising:
   a plurality of filters configured to perform band limitation, wherein a number of the plurality of filters is equal to a number of the plurality of antennas.

19. The communication station of claim 18, wherein the plurality of antennas includes three antennas.

* * * * *